(12) United States Patent
Hohengasser

(10) Patent No.: US 12,197,493 B2
(45) Date of Patent: Jan. 14, 2025

(54) SITUATIONAL NAVIGATION TOOL FOR CODES AND STANDARDS

(71) Applicant: National Fire Protection Association, Inc., Quincy, MA (US)

(72) Inventor: Erik Hohengasser, West Bridgewater, MA (US)

(73) Assignee: National Fire Protection Association, Inc., Quincy, MA (US)

( * ) Notice: Subject to any disclaimer, the term of this patent is extended or adjusted under 35 U.S.C. 154(b) by 0 days.

(21) Appl. No.: 17/393,143

(22) Filed: Aug. 3, 2021

(65) Prior Publication Data

US 2022/0035854 A1 Feb. 3, 2022

Related U.S. Application Data

(60) Provisional application No. 63/060,620, filed on Aug. 3, 2020.

(51) Int. Cl.
*G06F 16/00* (2019.01)
*G06F 3/0482* (2013.01)
*G06F 16/532* (2019.01)
*G06F 16/535* (2019.01)

(52) U.S. Cl.
CPC .......... *G06F 16/532* (2019.01); *G06F 3/0482* (2013.01); *G06F 16/535* (2019.01)

(58) Field of Classification Search
CPC ..... G06F 16/532; G06F 16/535; G06F 3/0482
See application file for complete search history.

(56) References Cited

U.S. PATENT DOCUMENTS

| | | | | |
|---|---|---|---|---|
| 2011/0023068 A1* | 1/2011 | Zeldis | .............. | H04N 21/47202 725/37 |
| 2012/0173553 A1* | 7/2012 | Johansson | .............. | G06F 16/958 707/754 |
| 2013/0110814 A1* | 5/2013 | Mohapatra | ............ | G06F 16/954 707/780 |
| 2013/0177296 A1* | 7/2013 | Geisner | ................ | H04N 9/8205 386/241 |
| 2013/0222373 A1* | 8/2013 | Weinstein | ............... | G06T 19/00 345/419 |

(Continued)

OTHER PUBLICATIONS

[No Author Listed], National Fire Protection Association. 2021. 19 pages. URL: https://www.nfpa.org, [last accessed Oct. 15, 2021].

*Primary Examiner* — Dinku W Gebresenbet
(74) *Attorney, Agent, or Firm* — Wolf, Greenfield & Sacks, P.C.

(57) ABSTRACT

Provided herein are systems, methods, and computer readable media for situational navigation. According to some embodiments, a list of multiple categories can be displayed to a user, and a selection of a category from the list of multiple categories can be obtained from the user. Based at least in part on the selection of the category, a list of one or more filters can be determined and displayed to the user. According to some embodiments, a selection of a first filter from the list of one or more filters can be obtained, from the user, where the first filter is associated with a first tag, and at least one of a situation or a solution can be displayed to the user, wherein the at least one of the situation or the solution is associated with one or more tags including the first tag.

17 Claims, 22 Drawing Sheets

(56) References Cited

U.S. PATENT DOCUMENTS

| | | | |
|---|---|---|---|
| 2014/0059069 A1* | 2/2014 | Taft | G06F 16/2428 |
| | | | 707/765 |
| 2014/0172821 A1* | 6/2014 | Hu | G06F 16/9535 |
| | | | 707/711 |
| 2015/0286670 A1* | 10/2015 | Hall | G06Q 10/06 |
| | | | 715/234 |
| 2016/0012135 A1* | 1/2016 | Wang | G06F 16/9535 |
| | | | 707/731 |
| 2017/0177706 A1* | 6/2017 | Ben-Tzur | G06F 16/2457 |
| 2019/0340252 A1* | 11/2019 | Huyghe | G06F 16/532 |

\* cited by examiner

SITUATIONAL NAVIGATION TOOL FOR CODES AND STANDARDS

RELATED APPLICATIONS

This application claims priority under 35 U.S.C. § 119(e) to U.S. Provisional Application Ser. No. 63/060,620, titled "SITUATIONAL NAVIGATION TOOL FOR CODES AND STANDARDS," filed on Aug. 3, 2020, which is herein incorporated by reference in its entirety.

BACKGROUND

Codes and standards are sets of rules, or elaborations thereof, that may be established and/or recommended by experts or other relevant stakeholders in a particular technical area in order to specify a desired outcome. Technical areas covered by codes and standards may include building and life safety, electrical systems and installations, emergency response, fire protection systems, and industrial systems. Codes and standards may be applied in a variety of situations by a variety of individuals, such as contractors, engineers, installers, inspectors, facility managers, members of fire services, students, and others.

SUMMARY

Provided herein in one embodiment is a system for situational navigation, the system comprising at least one computer hardware processor and at least one non-transitory computer-readable storage medium storing instructions that, when executed by the at least one computer hardware processor, cause the at least one computer processor to perform a method. According to some embodiments, the method may comprise displaying a list of multiple categories to a user, and obtaining, from the user, a selection of a category from the list of multiple categories. According to some embodiments, the method may comprise, based at least in part on the selection of the category, determining a list of one or more filters to display to the user, and displaying the list of one or more filters to the user. According to some embodiments, the method may comprise obtaining, from the user, a selection of a first filter from the list of one or more filters, wherein the first filter is associated with a first tag, and displaying at least one of a situation or a solution to the user, wherein the at least one of the situation or the solution is associated with one or more tags including the first tag.

In another embodiment, a non-transitory computer-readable media includes instructions. The instructions, when executed by one or more processors on a computing device, are operable to cause the one or more processors to perform a method. According to some embodiments, the method may comprise displaying a list of multiple categories to a user, and obtaining, from the user, a selection of a category from the list of multiple categories. According to some embodiments, the method may comprise, based at least in part on the selection of the category, determining a list of one or more filters to display to the user, and displaying the list of one or more filters to the user. According to some embodiments, the method may comprise obtaining, from the user, a selection of a first filter from the list of one or more filters, wherein the first filter is associated with a first tag, and displaying at least one of a situation or a solution to the user, wherein the at least one of the situation or the solution is associated with one or more tags including the first tag.

In another embodiment, a computerized method for situational navigation is provided. According to some embodiments, the method may comprise displaying a list of multiple categories to a user, and obtaining, from the user, a selection of a category from the list of multiple categories. According to some embodiments, the method may comprise, based at least in part on the selection of the category, determining a list of one or more filters to display to the user, and displaying the list of one or more filters to the user. According to some embodiments, the method may comprise obtaining, from the user, a selection of a first filter from the list of one or more filters, wherein the first filter is associated with a first tag, and displaying at least one of a situation or a solution to the user, wherein the at least one of the situation or the solution is associated with one or more tags including the first tag.

In one embodiment, the method may comprise obtaining, from the user, a selection of a second filter from the list of one or more filters, wherein the second filter is associated with a second tag.

In one embodiment, the at least one of a situation or a solution may be associated with one or more tags including the first tag and the second tag.

In one embodiment, the list of one or more filters may be selected from a plurality of filters, each of which is associated with a respective tag.

In one embodiment, determining the list of one or more filters to display to the user may be further based on a list of situations and/or solutions, each of which may be associated with one or more tags.

In one embodiment, determining the list of one or more filters to display to the user may be further based on a previously selected filter of the plurality of filters.

In one embodiment, determining the list of one or more filters to display to the user may comprise selecting, from the plurality of filters, a set of valid filters wherein, for each valid filter, there is at least one situation and/or solution having among its associated one or more tags a tag associated with the previously selected filter and a tag associated with the valid filter.

In one embodiment, the method may further comprise: obtaining, from the user, a selection of a second category from the list of multiple categories; based at least in part on the selection of the second category, determining a second list of one or more filters to display to the user; and displaying the second list of one or more filters to the user.

In one embodiment, the at least one of the situation or the solution displayed to the user may comprise a first situation, and wherein the first situation comprises an image.

In one embodiment a first point is displayed within the image.

In one embodiment, the first point may be associated with a second situation, different from the first situation.

In one embodiment, the first point may comprise a link to the second situation.

In one embodiment, the first point may comprise a link to a solution.

In one embodiment, the at least one of the situation or the solution displayed to the user may comprise a first solution, and wherein the first solution comprises one or more code sections.

In one embodiment, the first solution may further comprise one or more images related to the one or more code sections.

In one embodiment, the first solution may further comprise additional text summarizing the one or more code sections.

In one embodiment, the first solution may comprise at least one link to a second solution, different from the first solution.

In one embodiment, the first solution may comprise related content, the related content comprising at least one of a document, an image, a video, or a link.

In one embodiment, the related content may comprise manufacturer information.

DETAILED DESCRIPTION

Historically, codes and standards have been recorded and published in physical books. However, the inventor(s) have recognized and appreciated that there may be advantages to delivering codes and standards in a digital, rather than physical, paradigm.

Figures 1, 2:
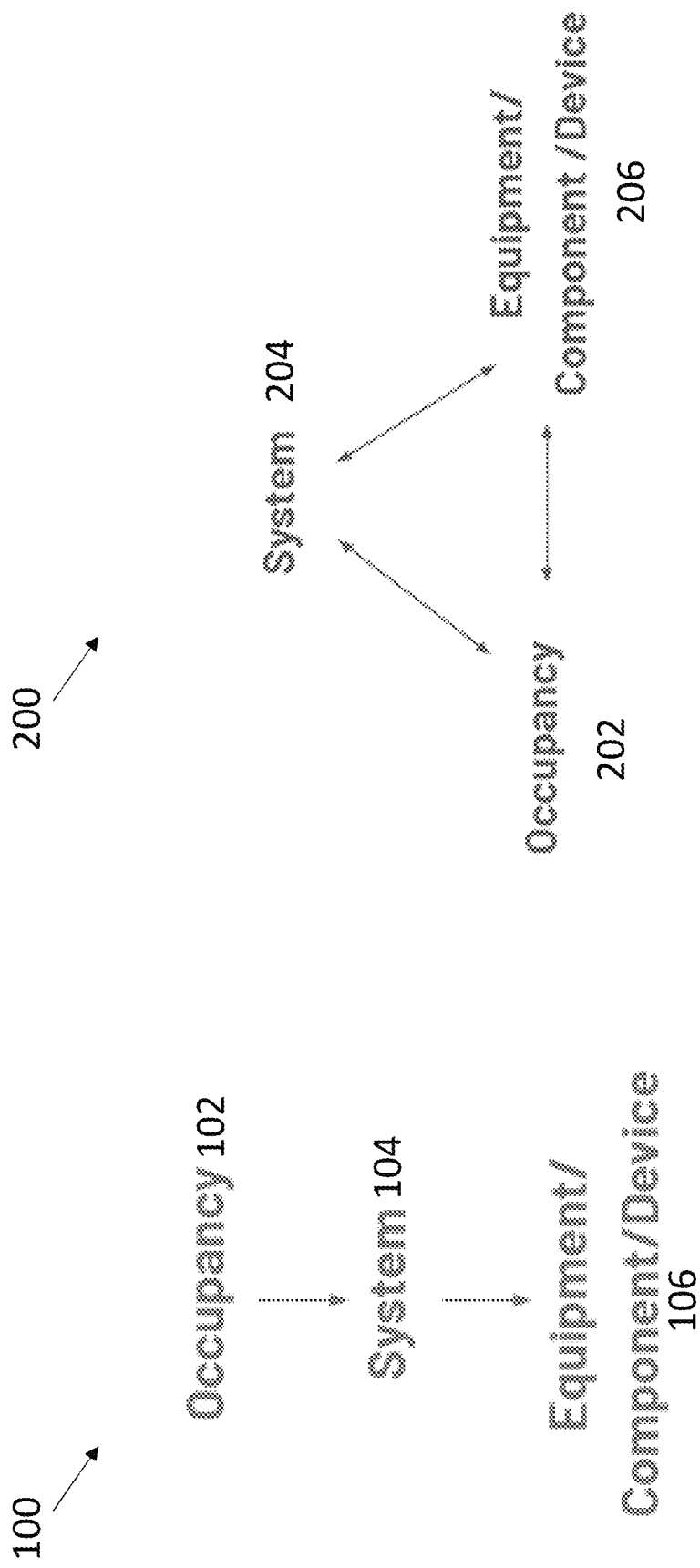
FIG. 1 shows an example of a linear solution path, according to some embodiments of the technology described herein.
FIG. 2 shows an example of a non-linear solution path, according to some embodiments of the technology described herein.

For example, in a real-world scenario where accessing codes and/or standards may be necessary (e.g., at a construction or installation site, such as by a contractor, installer, or engineer) obtaining a physical book may be difficult, and accessing information stored therein may be substantially less efficient than desired. Additionally, for any given situation calling for codes and/or standards to be used, there may be numerous relevant codes and/or standards, not all of which may be initially known or apparent to the individual accessing the codes and/or standards. In some cases, with conventional techniques, it may be challenging for an individual to even determine what category or categories of codes and/or standards may be relevant to their situation. This presents a significant problem with conventional techniques for delivering codes and/or standards, since conventional techniques tend to present information in a linear manner (e.g., as shown in FIG. 1) that requires users to know in advance what categories of codes and/or standards are relevant to their situation.

Another challenge associated with existing paradigms is that the relevant codes and/or standards for a particular situation may be distributed throughout multiple books. For example, in the context of a commercial kitchen, there may be relevant codes and/or standards relating to electrical systems, fire protection systems, and/or industrial systems, each of which may be located in a different book of codes and/or standards. As a result, individuals interested in accessing codes and/or standards (e.g., facility managers, contractors, installers, engineers, etc.) may have difficulty finding relevant codes and/or standards for their situation, or may do so with less efficiency or accuracy than desired.

Some codes and/or standards, such as codes or standards from the National Fire Protection Association (NFPA) and/or other standard development organizations (SDOs), may also be available in digital form. The inventor(s) have recognized and appreciated, however, that many of the above-identified challenges with conventional techniques tend to persist in a digital paradigm. For example, eBooks or other digital book formats (e.g., PDFs, etc.) may be similarly inefficient and challenging to navigate for individuals in real-world scenarios (e.g., because individuals may not know in advance what codes and/or standards will be relevant to their situation, or may need to access codes and/or standards from multiple books across multiple subject areas). In some cases, still further challenges may be associated with accessing digital versions of codes and/or standards. For example, digital access may be difficult in real-world scenarios where the only available devices may have smaller displays, less computing power, and shorter battery life than desired (e.g., a mobile device such as a smartphone).

Recognizing and appreciating the foregoing, the inventor(s) have developed technical improvements to conventional code and standard technology (e.g., electronically provided codes/standards in book form) for delivering information to users via a situational navigation tool that leverages context to accurately and efficiently lead users to information relevant to their situation. Although examples are provided herein wherein the information to be accessed includes codes and/or standards, it should be appreciated that other types of information may be used with the techniques described herein (e.g., laws or regulations; information that might traditionally be stored in encyclopedias or textbooks, such as scientific, medical, mathematical, linguistic, or historical information).

Accordingly, described herein is a situational navigation tool designed to be an improved way for users to navigate codes and standards (e.g., National Fire Protection Association ("NFPA") codes and standards) as well as other supporting information. The situational navigation tool guides users through the navigation process and allows them to apply filters based on real life context, ultimately leading users to the codes/standards and supporting material relevant to their current situation. Codes and standards are generally written to follow a certain style guide with various relevant requirements spread throughout a document. However, the application of those standards tends to happen in real world situations where such a style can not only be inconvenient, but can lead to missed information and/or incorrect information. The situational navigation tool described herein helps bridge the gap to provide a user-friendly way for users to navigate applicable codes or standards in real-world situations. In one embodiment, the situational navigation tool may utilize three components (e.g., category filters, situations, and solutions, as described herein below) to lead a user to information they may need, based on the situation they are in, and organize the information by subject (e.g., including an aggregate of relevant NFPA codes as well as subject based expertise).

According to some embodiments, the situational navigation tool may store a database and/or repository of applicable information, such as codes, standards, and/or other information. The situational navigation tool may further store a set of logic and/or rules that relate categories and filters to the stored codes, standards, and/or other information. The situational navigation tool can display a list of multiple categories to a user that are relevant to the stored information. The situational navigation tool can obtain, from the user, a selection of a category from the list of multiple categories. According to some embodiments, based at least in part on the selection of the category, the situational navigational tool can determine a list of one or more filters to display to the user, and display the list of one or more filters to the user. The filters can allow, for example, the user to select filters to start to specify criteria specific to the user's particular environment or situation. According to some embodiments, the situational navigational tool can obtain, from the user, a selection of a first filter from the list of one or more filters. The selected first filter can be associated with a first tag, such that the situational navigation tool can display at least one of a situation or a solution to the user, wherein the at least one of the situation or the solution is associated with one or more tags including the first tag. For example, one or more category tags can be associated with a solution, and each category filter may be associated with a respective tag, such that applying the category filters leads to the situational navigation tool displaying solutions with corresponding category tags.

The situational navigational tool provides a technical improvement to conventional technology used to provide users with electronic access to codes, standards, and/or other information. In particular, as described above, conventional technology provides codes or standards in book form to users through electronic means. As a result, it can be difficult for users to easily navigate such electronic information since users must navigate such information essentially as if flipping through a physical book. Further, since different codes, standards or other relevant information may be stored in different electronic sources, it can be difficult for a user to identify the full set of applicable information for their environment or situation. The situational navigation tool provided herein provides technical improvements to such conventional technology by providing a central repository or database of codes, standards, and/or other information, and also providing a user-friendly way for users to easily identify applicable information by allowing a user to intuitively search based on various categories, situations, solutions, and related filters, as described herein. As a result, even if a user is accessing the situational navigational tool using a device with a small display and/or limited computing power, the user can easily and intuitively identify applicable codes, standards and/or other information by leveraging the searching and filtering functionality provided through the situational navigation tool. This technology is described in further detail herein.

Categories and Category Filters

Categories can provide classifications that can be used for a particular situation or environment. The categories can be used, for example, to provide a high-level classification of the environment, which can be further filtered as described herein. In one example, the categories may include "Occupancy" (e.g., an occupancy type for a structure, such as for a house, building, etc.), "Space" (e.g., a space within a structure, such as a kitchen, bathroom, etc.), "System" (e.g., fire protection system, electrical system, etc.), and "Equipment" (e.g., electric panels, fire alarm panels, etc.). Further examples of categories may include "Electrical", "Building and Life Safety", "Fire Protection", or any other suitable category or categories. The number and type of categories is not limited in this regard, and may include fewer or more categories in some embodiments. For example, in one embodiment, categories relevant to a particular user (e.g., as specified by the user, or as automatically determined from user data such as search history) may be included, while less relevant categories may not be included.

Each category can include one or more category filters. Category filters are filters within a category that may be selected by a user based upon the context of the environment where they are applying codes and standards. Furthermore, the filters within each category may include any suitable filters, which are not limited in type or number. For example, in some embodiments, particular users may see a shortened or expanded list of filters based on their preferences or inferred interests. As the user applies filters from the selected categories, the results (which may include situations and solutions, for example, as described herein) may be narrowed to only those results meeting the criteria selected.

Situations

Situations may be one type of result returned to the user as the user applies category filters (or, in some examples, when a keyword search is performed). Examples of situations can include, for example, a residential kitchen, a residential bathroom, a commercial kitchen, a commercial bathroom, etc. Situations may include visual cues to provide more context to the user as they look to connect their day-to-day, situational questions with the codes and/or standards that may be relevant. In some embodiments, situations may be associated with one or more solution(s) or related situation(s). Situations can be nested within situations. In some embodiments, some or all of the following elements may make up a situation:

A title and/or a subtitle for the situation, which may comprise a brief description of the subject matter represented in the image and collection of solution(s) and situation(s) associated with the situation.

Category tags associated with the situation (e.g., a business occupancy, a kitchen space, etc.). For example, as described herein, each category filter may be associated with a respective tag, such that applying the category filters leads to situations having corresponding category tags being displayed.

An image associated with the situation, which may include one or more hotspots. As described herein, hotspots may be points on the image which are associated with related solution(s) or situation(s). Hotspots may be added to an image using an admin tool, which may be referred to herein as a situational navigation management system.

Additional information relevant to the situation. For example, in addition to the context delivered through the image with or without hotspots, rich text and additional images can be associated with the situation.

Solutions

According to some embodiments, a solution may be the final step in using a situational navigation tool as described herein. For example, a solution for a business occupancy and kitchen space could include a hood fan for a commercial kitchen, a garbage disposal for a commercial kitchen, a counter-mounted cooking unit for a commercial kitchen, etc., as described further herein. Solutions may present the user with relevant code sections or standards, which may be aggregated from a number of relevant publications, such as all publications from the National Fire Protection Association. In addition to code sections, a solution can provided subject based expertise and context through additional information types associated with solutions. In some embodiments, some or all of the following elements may make up a solution:

- A title and/or subtitle for the solution, which may comprise a brief description of the subject matter represented in the following code sections, standards, or supporting information.
- A body of the solution, which may comprise subject matter expertise delivered through rich text and/or image(s).
- Category tags associated with the solution. For example, as described herein, each category filter may be associated with a respective tag, such that applying the category filters leads to solutions having corresponding category tags being displayed.
- Code sections and/or standards. In one embodiment, this may be an aggregate of all relevant NFPA code sections and/or standards. The codes and/or standards displayed may be based on the subject of the solution page, and may be presented along with information regarding publication and edition.
- Related content, which may include one or more documents, images, or videos associated with the subject of the solution. In one example, manufacturer's information may be included in a solution (e.g., a link to a manufacturer who creates equipment adhering to a particular code or standard).
- Related Solutions. For example, other solutions with similar subject matter may be displayed. These solutions may be determined and populated manually (e.g., based on a prediction of what solution(s) a user may be interested in after looking at a given solution), and/or may be determined automatically (e.g., based on user data, such as data indicating which solution(s) users may frequently access after accessing a given solution).

Code/Standard Repository or Database

The situational navigation tool can store and/or have access to a large set of relevant codes, standards, and subject-based information and expertise. For example, the situational navigation tool can provide access to various NFPA codes or standards, such as the codes and standards available at https://www.nfpa.org/, which are hereby incorporated by reference herein in their entirety. As another example, the situational navigation tool can provide access to other codes and/or standards from other SDOs (e.g., separate from and/or in addition to NFPA codes or standards). As a further example, the content can include one or more documents, images, and/or videos that can be the subject of solutions provided through the situational navigation tool. For example, manufacturer's information may be included in a solution (e.g., a link to a manufacturer who creates equipment adhering to a particular code or standard), as described herein. While examples are provided herein wherein the information to be accessed includes codes and/or standards, including with reference to NFPA codes and standards, it should be appreciated that other codes, standards, and/or types of information may be used with the techniques described herein, including laws, regulations, and/or other information that might traditionally be stored in encyclopedias or textbooks (including in electronic form, such as scientific, medical, mathematical, linguistic, or historical information).

In some embodiments, such underlying information can be stored in a database or repository available to the situational navigation tool. For example, structured databases (e.g., SQL) or unstructured databases (e.g., MongoDB) can be used to store such information. In some embodiments, the underlying information can be stored in a distributed database. In some embodiments, the situational navigational tool may interface with one or more data sources, such as through one or more application programming interfaces (APIs). In some embodiments, one or more portions of the database can be stored in a cloud database. It should be appreciated that while some examples of data storage techniques are provided herein, the techniques are not so limited.

In some embodiments, the situational navigation tool includes a set of logic and/or rules that the situational navigation tool uses to provide the functionality described herein to allow a user to search for relevant information based on categories and associated filters. In some embodiments, the logic maintains a set of applicable categories based on the information provided by the situational navigational tool. For example, as codes or standards are added to the tool, additional categories can be created and stored in the logic. As another example, if codes or standards are removed (e.g., if outdated or superseded), then the categories can be adjusted accordingly to remove any categories that no longer apply to the underlying data. As described further herein, the logic can also be applied in real-time as the user selects categories and filters to remove any filters that are not applicable based on the current user selection.

FIG. 1 shows an example of a linear solution path 100, according to some examples. In the illustrated example, a user seeking information about a particular component, piece of equipment, or device, may be required to know or specify a relevant occupancy 102 (e.g., residential, educational, mercantile, etc.) and/or system 104 in order to access the desired information about the particular component, piece of equipment, or device 106. Even if the user is interested in the particular component, piece of equipment, or device 106 as it pertains to multiple categories (e.g., across different occupancy 102 or system 104 types), the user may only be able to access information within the limited category selections allowed by the predefined, linear hierarchy of categories (in this example, which are first selected based on occupancy 102 and then system 104). For example, with traditional books (which may be physical or digital format) a user may need to first select a relevant book, then utilize a table of contents of the book to determine a relevant chapter, and then further determine which sections, subsections, and/or individual codes may be relevant to a particular situation.

FIG. 2 shows an example of a non-linear solution path 200, according to some embodiments. As described herein with respect to the techniques developed by the inventors, a user may be seeking information without knowing which particular categories that information falls into (e.g., a user may be interested in codes and/or standards relating to kitchen safety, but may be unsure whether the occupancy 202 will be residential or mercantile). Furthermore, a user may want to access information based on categories at multiple levels of a hierarchy, without needing to select one or more categories at other levels of the hierarchy (e.g., a user may wish to understand codes and/or standards relevant to hood fans in kitchens across a variety of occupancy types). As shown in the figure, a non-linear solution path may allow the user to specify one or more categories (including occupancy 202, system 204, and equipment, component, or device 206) in any order, without being limited by a linear hierarchy as in FIG. 1.

Figure 3:
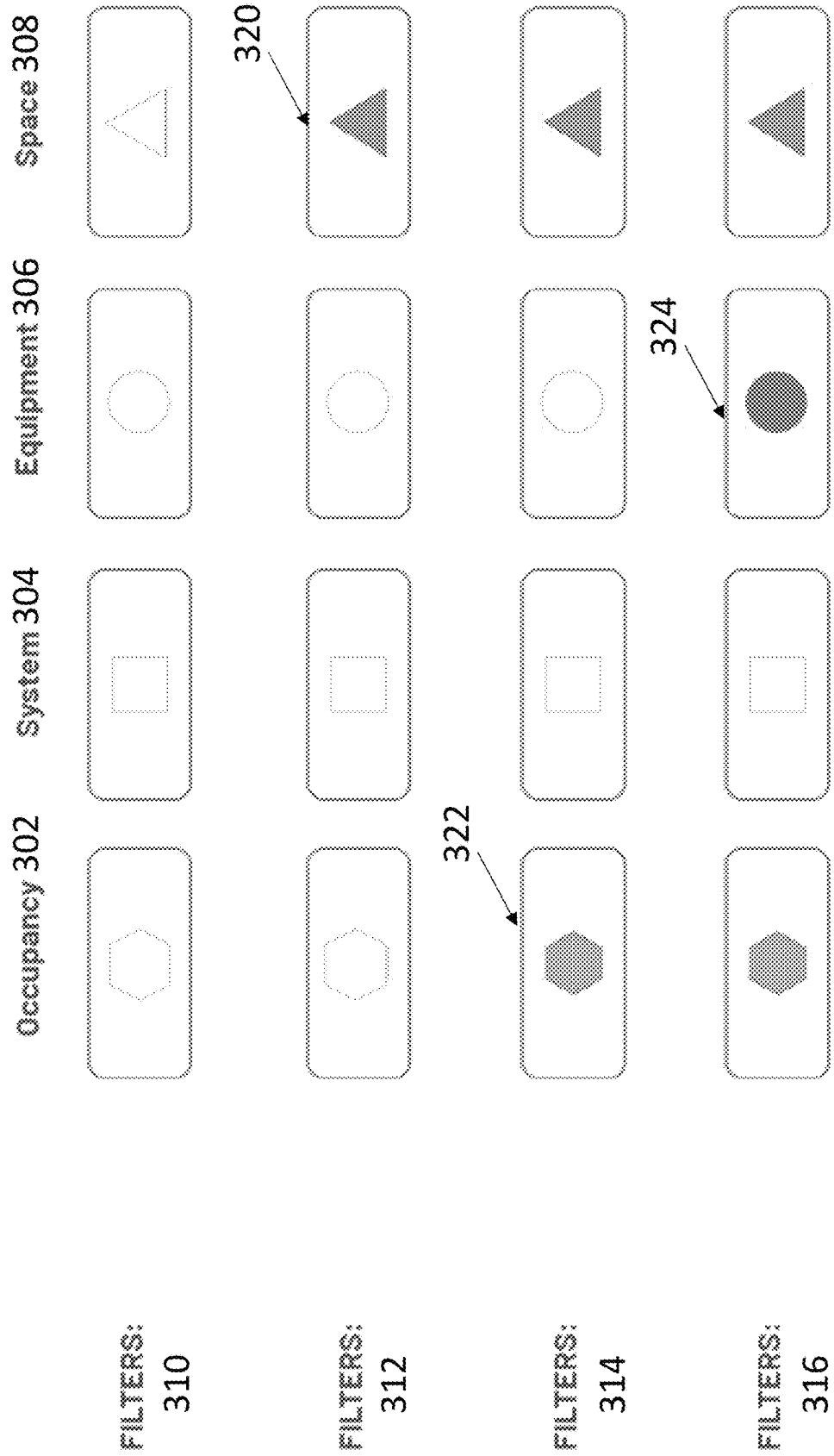
FIG. 3 shows an example of filters, according to some embodiments of the technology described herein.
Figure 4:
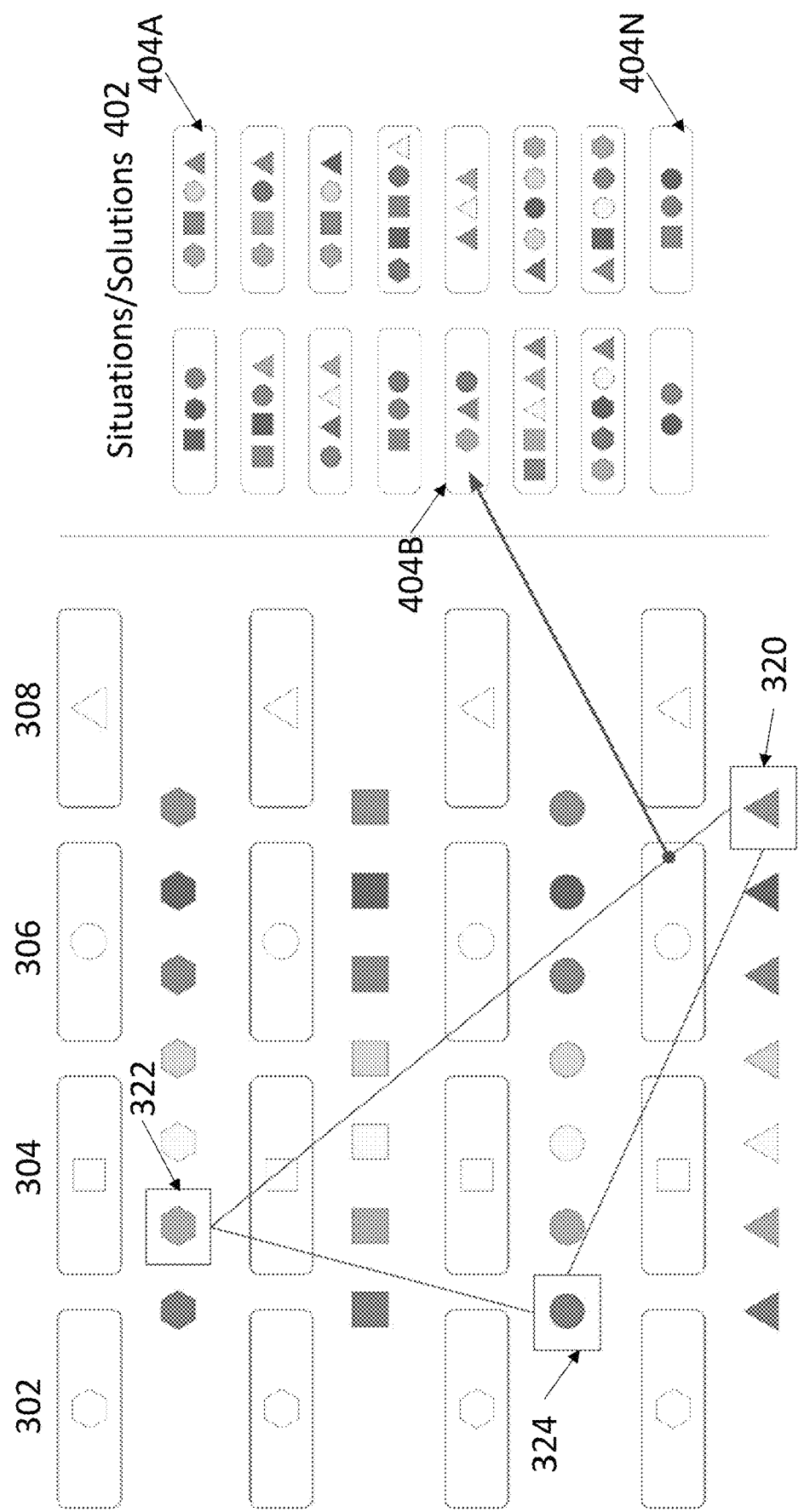
FIG. 4 shows an example of filters being applied to situations and/or solutions, according to some embodiments of the technology described herein.

FIG. 3 and FIG. 4 show an example of filters being applied to situations and/or solutions to achieve a non-linear solution path. In FIG. 3, filters can be applied for the Occupancy 302, System 304, Equipment 306 and Space 308 categories. In the example in FIG. 3, at step 310, initially no filters are applied. At step 312, it is shown that the user first applies a filter 320 (represented by the triangle) in the Space 308 category, then at step 314 a filter 322 (represented by the hexagon) in the Occupancy 302 category, and finally at step 316 a filter 324 (represented by the circle) in the Equipment 306 category. In FIG. 4, shows how the system uses the selection of filters to determine one or more relevant situations and/or solutions. As shown on the righthand side of the figure, the situations and/or solutions 402 may have tags 404A-404N, each represented by a different combination of shapes corresponding to different filters that can be selected as shown in FIG. 3. In this example, the selection of the filters 322 (corresponding the hexagon), 324 (circle), and 320 (triangle) has resulted in matching to a solution 404B having among its tags the same filters (shown by the hexagon, triangle, and circle in the solution 404B). Although shapes are used in this is example for illustrative purposes, it is to be appreciated that the filters may be content-related, as described herein.

Figure 5:
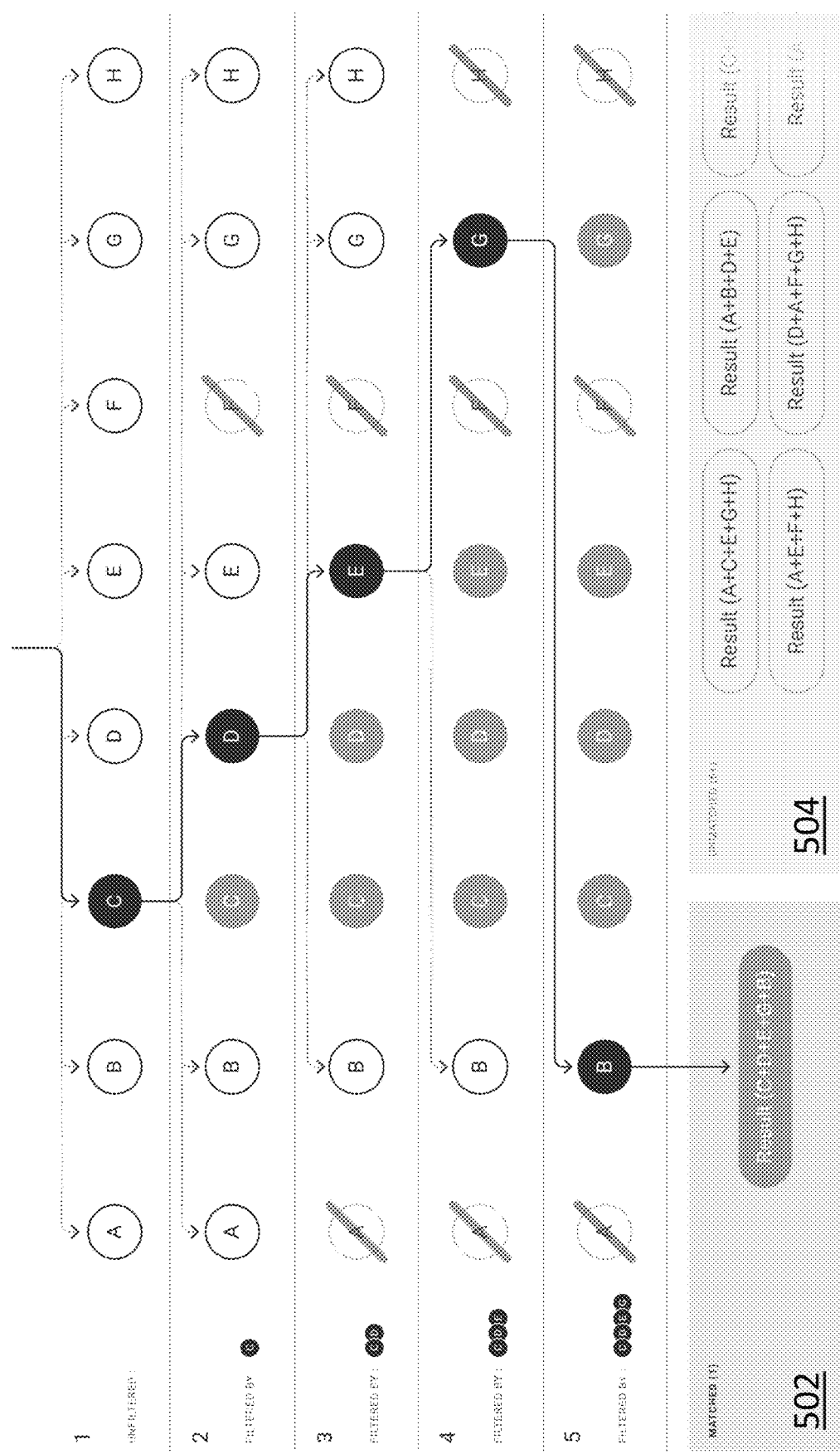
FIG. 5 shows an example of filters being applied to situations and/or solutions, according to some embodiments of the technology described herein.

FIG. 5 shows an example of filters being applied to situations and/or solutions, according to some embodiments of the technology described herein. In this example, letters are used to represent the different filters. As shown in the figure at the step 1, the unfiltered results may initially be filtered by a filter C. At step 2, a further filter may be selected—in this case, filter D. Note that the filter F is no longer an option to be selected at step 2. This may be because, for example, there are no valid solutions having tags corresponding to both filters C and F. As a result, filter F may be removed from a list of valid filters once filter C has been selected (as in step 1 of FIG. 5).

At step 3, filter E is selected. As shown, the selection of filter D in step 2 has eliminated filter A from the list of valid filters, since there are no solutions having C, D, and A as tags. Similarly, at step 4, filter G is selected, while filter H is removed from the list of valid filters since there are no solutions having tags corresponding to the previously selected filters (C, D, E) and the filter H. Finally, at step 5, filter B is selected.

As shown at the bottom of FIG. 5, there may be a one or more matched solutions 502 corresponding the filter(s) selected in the previous steps. Although in this example, a single solution is matched with the resulting selected set of filters C, D, E, G and B, it may be possible for multiple solutions to correspond to a given set of selected filters (and thus, multiple matched solutions would be shown in 502). Furthermore, a set of matched solutions may be established at intermediate steps, before the user has necessarily applied all the desired filters (e.g., a list of matched solutions may be maintained and updated as one or more filters are applied). FIG. 5 also shows, for illustrative purposes, various unmatched filters that are not matched with the current set of selected filters (e.g., but could match with a different set of selected filters).

Figure 6A:
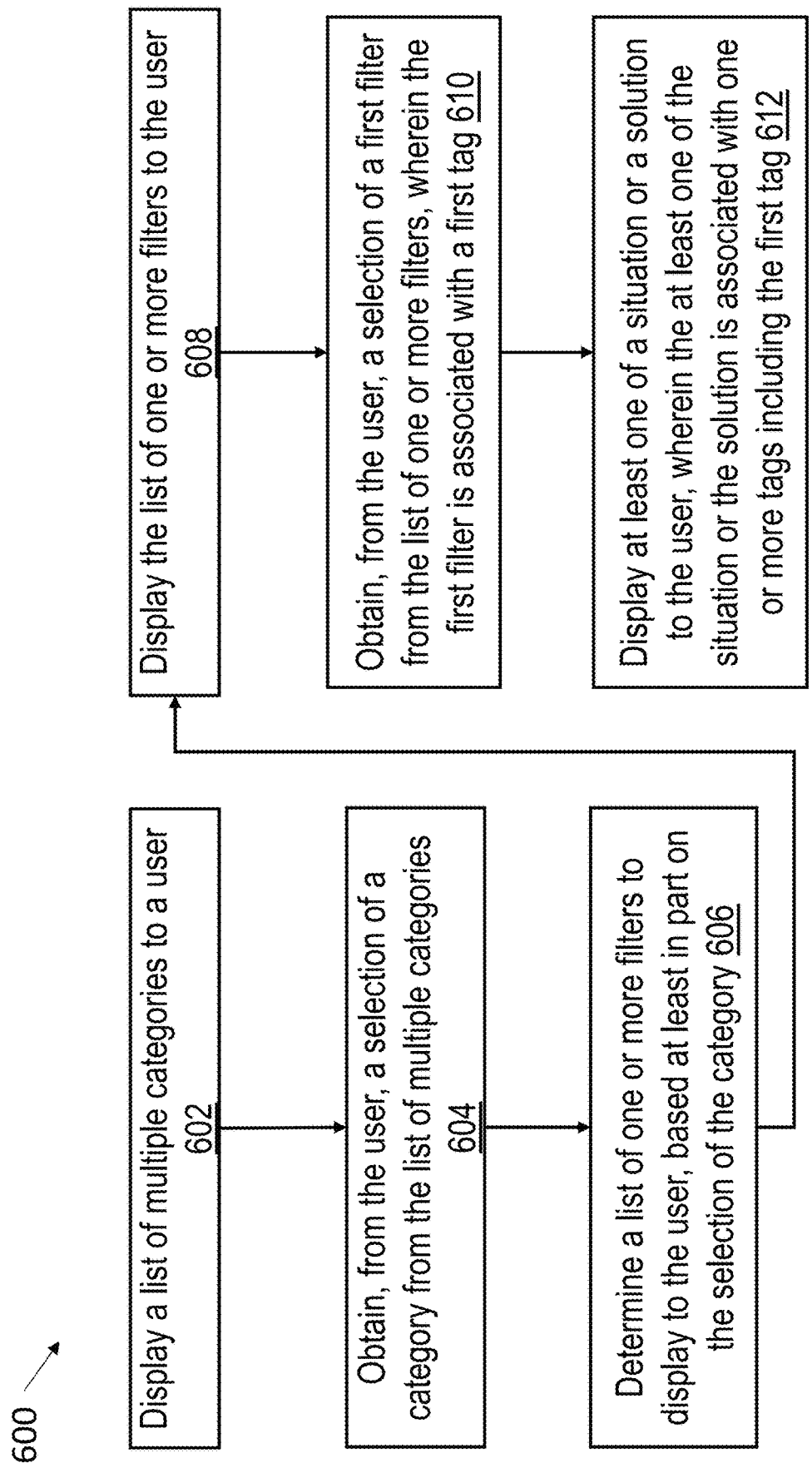
FIG. 6A shows an illustrative method of using a situational navigation system, according to some embodiments of the technology described herein.

FIG. 6A shows an illustrative computerized method 600 of using a situational navigation system, according to some embodiments. The illustrated method 600 may be performed using a computing device, such as that described in conjunction with FIG. 24. For example, the computing device may comprise at least one computer hardware processor (e.g., of a desktop computer, laptop, mobile device, or any other suitable computing device) and at least one non-transitory computer-readable storage medium (e.g., memory) storing instructions (e.g., software) that, when executed by the at least one computer hardware processor, cause the at least one computer processor to perform the illustrated method.

Figure 7:
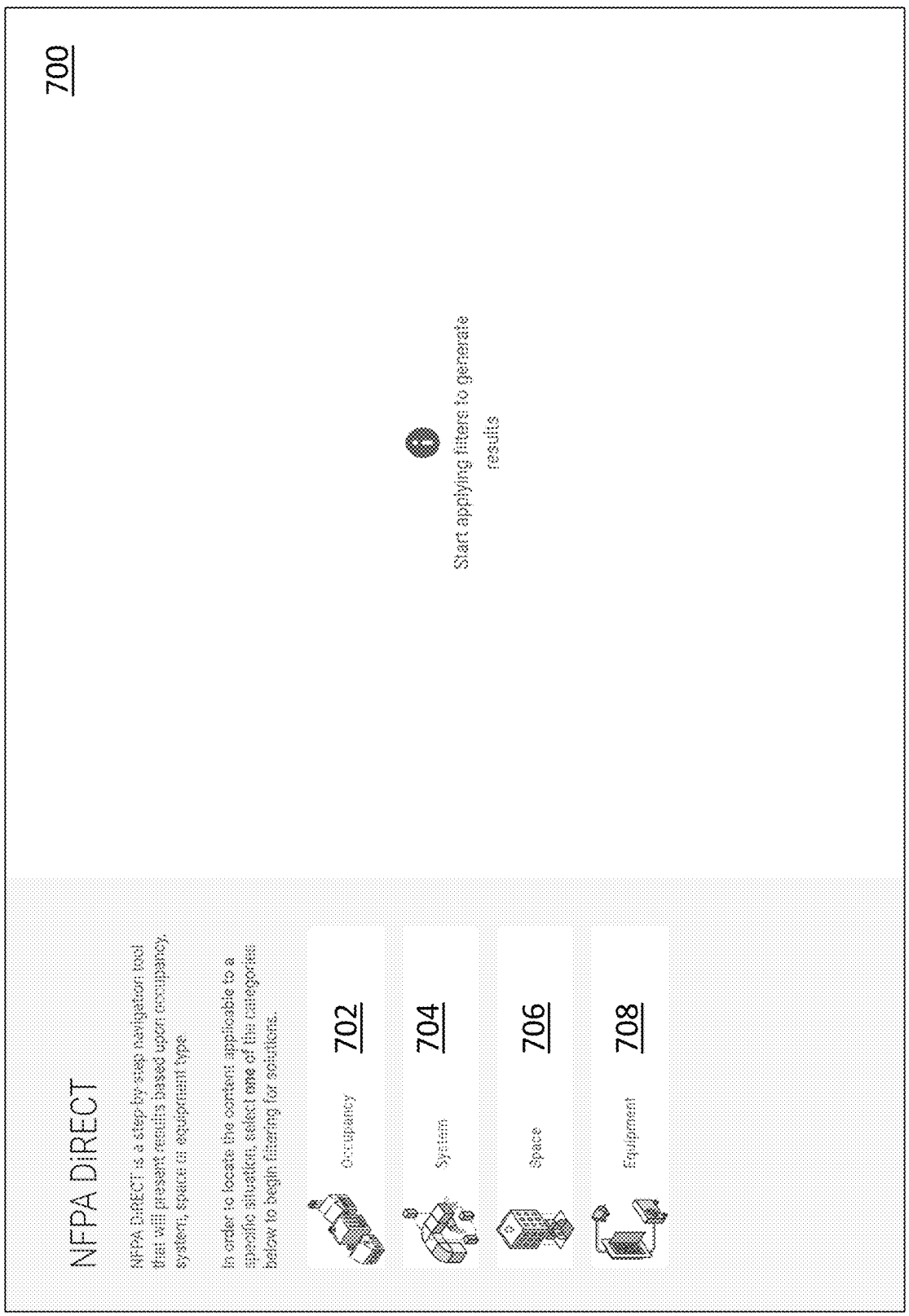
FIGS. 7-14 show illustrative user interfaces of a situational navigation system, according to some embodiments of the technology described herein.
Figure 8:
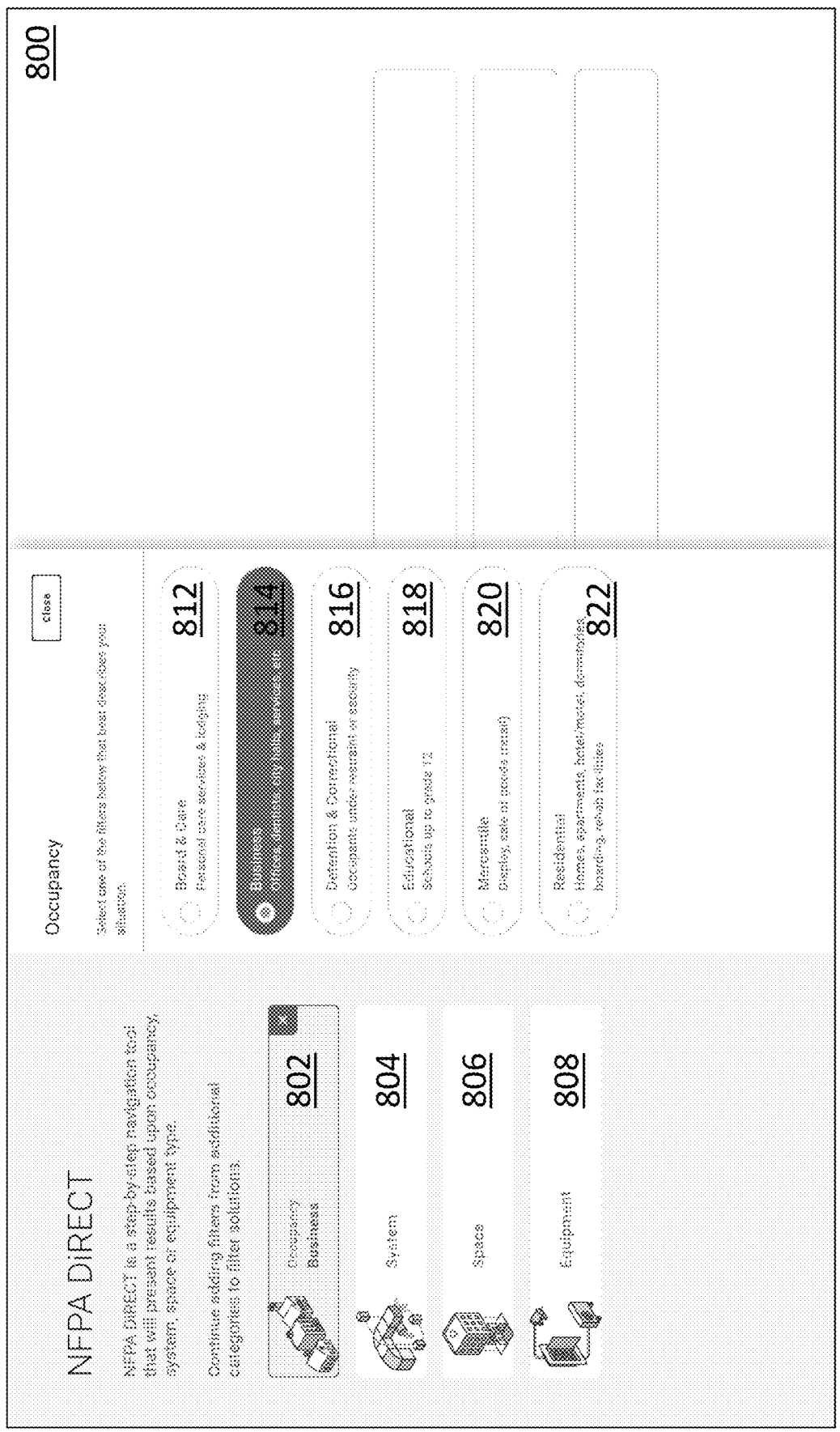
Figure 9:
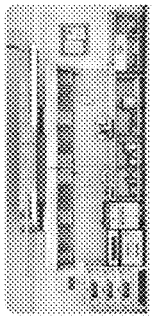

For example, as shown in FIG. 6A, at step 602 the method 600 may include the computing device displaying a list of multiple categories to a user (e.g., as shown in FIG. 7, wherein the categories are "Occupancy", "System", "Space", and "Equipment") and the computing device obtaining at step 604, from the user, a selection of a category from the list of multiple categories (e.g., as shown in FIGS. 8 and 9, wherein the selected categories are highlighted). The method 600 may further comprise at step 606, determining, by the computing device, a list one or more filters to display to the user based at least in part on the selection of the category, and displaying at step 608 the list of one or more filters to the user (e.g., as shown in FIG. 8, wherein the list of filters includes "Board & Care", "Business", "Detention & Correction", "Educational", "Mercantile", and "Residential"). The method 600 may further comprise, at step 610 obtaining, by the computing device from the user, a selection of a first filter from the list of one or more filters, wherein the first filter is associated with a first tag (e.g., as shown in FIG. 8, wherein the filter associated with the tag "Business" is highlighted). Additionally, the method may comprise the computing device displaying, at step 612, at least one of a situation or a solution to the user (e.g., as shown in FIGS. 9-14, and described herein), wherein the at least one of the situation or the solution is associated with one or more tags including the first tag (e.g., in the example of FIG. 9, situation(s) and/or solution(s) with the tag "Business" are displayed).

Figure 6B:
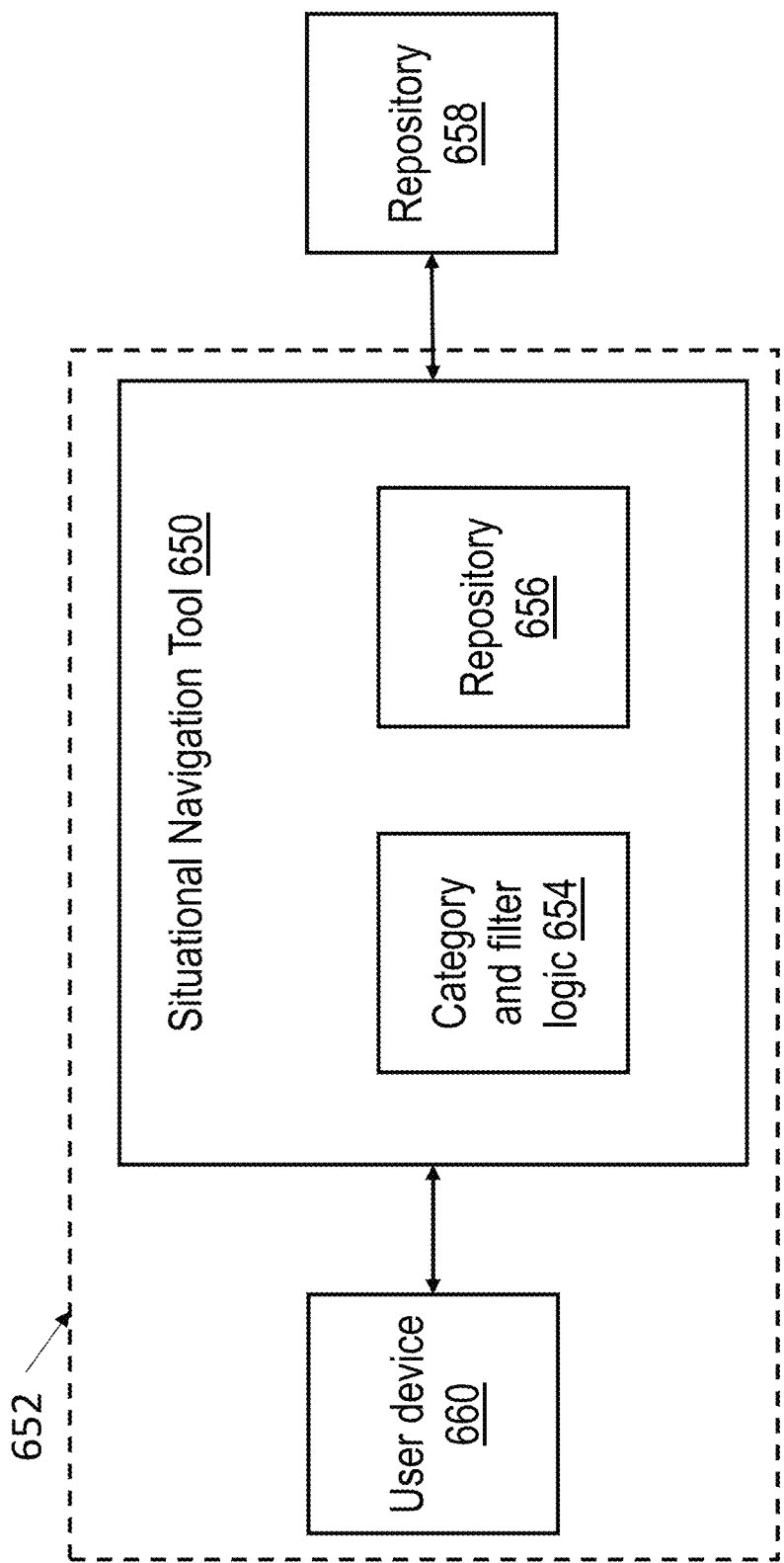
FIG. 6B shows an exemplary situational navigational system that can implement the illustrative method of FIG. 6A, according to some embodiments of the technology described herein.

FIG. 6B shows an exemplary situational navigation system 650 that can implement the illustrative method of FIG. 6A. The situational navigation system 650 includes category and filter logic 654 and a repository 656 of relevant information (e.g., codes, standards, other information). The situational navigation system 650 can communicate with a user device 660, such as a smartphone, tablet, laptop, PC, etc. In some embodiments, the situational navigation system 650 is separate from the user device 660 (e.g., and accessed via a web interface). In some embodiments, the situational navigation system 650 is executed partially and/or entirely locally at the user device 660, as indicated by the dotted box 652. The situation navigation system 650 can be in communication with one or more external data sources or repositories 658, as described herein (e.g., via database interfaces, cloud interfaces, and/or APIs).

FIG. 7 shows an illustrative user interface 700 of a situational navigation system, according to some embodiments of the technology described herein. In the illustrated example, categories are displayed on the left side of the interface 700. Although the categories Occupancy 702, System 704, Space 706, and Equipment 708 are shown, it should be appreciated any number and type of categories may be used, which may include subject-matter specific categories.

FIG. 8 shows a further illustrative user interface 800 of a situational navigation system, according to some embodiments of the technology described herein. Similar to FIG. 7, the user interface 800 includes the categories Occupancy

802, System 804, Space 806, and Equipment 808. The system can change from displaying the interface 700 of FIG. 7 to displaying the interface 800 of FIG. 8 if, for example, a user selects the occupancy 702 category in the interface 700 of FIG. 7. In the illustrated example, a list of filters within the Occupancy 802 category are depicted, including Board & Care 812, Business 814, Detention & Correctional 816, Educational 818, Mercantile 820, and Residential 822. In the illustrated example, the Business 814 filter has been selected (e.g., by a user, such as with mouse click, screen tap, or other user input). Although not shown, the list of filters may be reduced based on one or more previously selected filters and the tags associated with the existing solutions and/or situations. For example, if the user were to select the Space 806 category after selecting the Business 814 filter within the Occupancy 802 category, then certain filters in the Space 806 category may be eliminated from the displayed list because there are no valid solutions corresponding to those eliminated filters and the Business 814 filter. For example, a "Living Room" filter within the Space 806 category may be eliminated if there is no solution or situation having both the "Living Room" and Business 814 tags.

FIG. 9 shows a further illustrative user interface 900 of a situational navigation system, according to some embodiments of the technology described herein. Similar to FIGS. 7-8, the user interface 900 includes the categories Occupancy 902, System 904, Space 906, and Equipment 908. The system can change from displaying the interface 800 of FIG. 8 to displaying the interface 900 of FIG. 9 if, for example, a user selects the space 806 category in the interface 800 of FIG. 8. In the illustrated example, two filters have been selected ("Business" in the Occupancy 902 category as discussed in FIG. 8, and "Kitchen" in the Space 906 category). On the righthand side of the interface 900, a commercial kitchen 912 situation and three solutions (commercial kitchen—hood fan 914, commercial kitchen—garbage disposal 916, and commercial kitchen—counter-mounted cooking unit 918) are displayed in the user interface 900. In other cases, fewer or more situations or solutions may be shown, as the techniques developed by the inventors are not limited in this regard. In one embodiment, if only filters having valid results are displayed to the user (as described with respect to FIG. 8), it may be impossible for a user to select a set of filters that results in no situations or solutions being shown.

Figure 10:
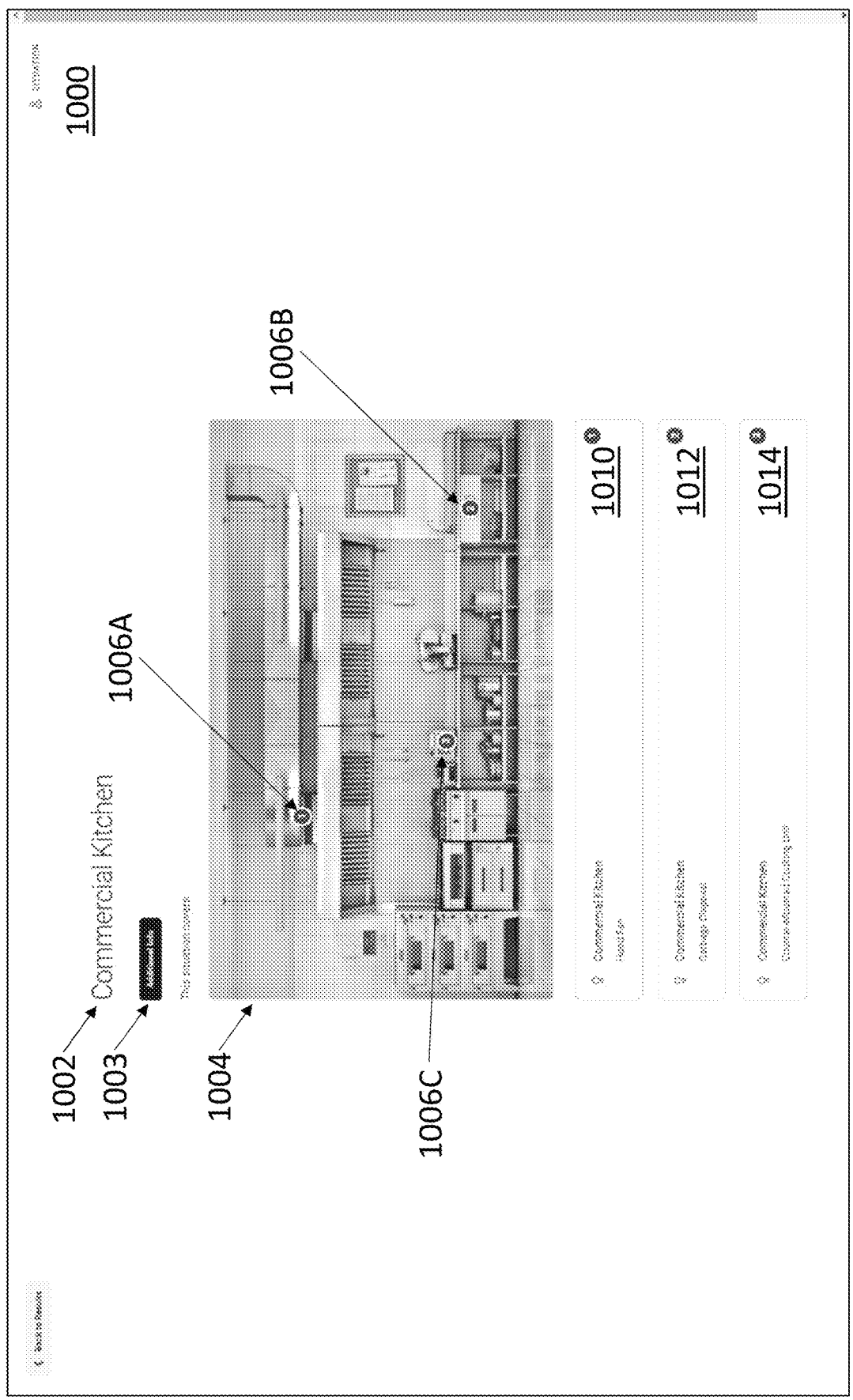

FIG. 10 shows a further illustrative user interface 1000 of a situational navigation system, according to some embodiments of the technology described herein. The system can change from displaying the interface 900 of FIG. 9 to displaying the interface 1000 of FIG. 10 if, for example, a user selects the commercial kitchen situation 912 in the interface 900 of FIG. 9. In the illustrated example, a situation is shown. In this example, the title 1002 of the situation is "Commercial Kitchen". In this example, there is no subtitle, but a subtitle may be displayed, for example, below or next to the title. In the illustrated example, the situation includes an image 1004 of an exemplary commercial kitchen. Although the image 1004 in this example is a two-dimensional image, a three-dimensional image (e.g., a 3D model, which may viewed in virtual reality, for example) is also possible in some embodiments. In this example, the image contains three hotspots, labeled "1" 1006A, "2" 1006B, and "3" 1006C (collectively referred to as hotspots 1006). As shown, the hotspots may be associated with particular locations or objects in the image (e.g., the hotspot "1" 1006A indicates a hood fan, the hotspot "2" 1006B indicates a garbage disposal, and the hotspot "3" 1006C indicated a counter-mounted cooking unit in the image). Further, as shown below the image 1004, each hotspot 1006 may be associated with a corresponding solution, shown in this example as commercial kitchen—hood fan 1010 (associated with hotspot "1" 1006A), commercial kitchen—garbage disposal 1012 (associated with hotspot "2" 1006B), and commercial kitchen—counter-mounted cooking unit 1014 (associated with hotspot "3" 1006C). According to some embodiments, the information displayed below the image may provide link(s) to corresponding solution(s), or the hotspot(s) themselves may comprise one or more links.

Figure 11:
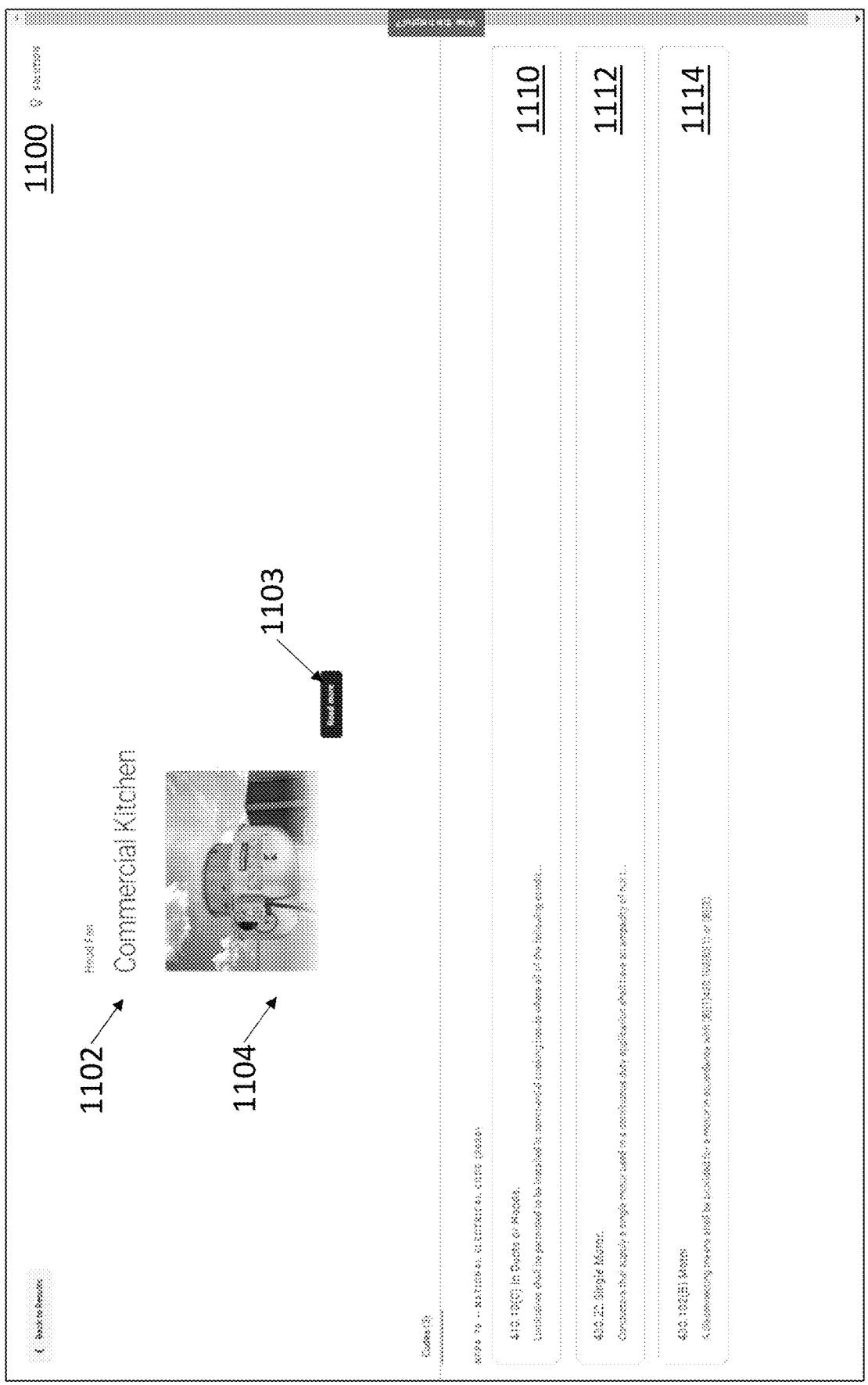

FIG. 11 shows a further illustrative user interface 1100 of a situational navigation system, according to some embodiments of the technology described herein. In the illustrated example, a solution is shown. The system can change from displaying the interface 1000 of FIG. 10 to displaying the interface 1100 of FIG. 11 if, for example, a user selects the additional information button 1003 in the interface 1000 of FIG. 10. In this example, the title 1102 of the solution is "Hood Fan", and an image 1104 and a list of relevant codes (from the National Electrical Code®, 2020, in this example) are displayed, including 410.10C in ducts or hoods 1110, 430.22 single motor 1112, and 430.102(B) motor 1114.

Figure 12:

FIG. 12 shows a further illustrative user interface 1200 of a situational navigation system, according to some embodiments of the technology described herein. The system can change from displaying the interface 1100 of FIG. 11 to displaying the interface 1200 of FIG. 12 if, for example, a user selects the read more button 1103 in the interface 1100 of FIG. 11. In the illustrated example, a solution with the title 1202 "Commercial Kitchen" with additional text 1206 below the image 1204 is shown. This text may comprise the body of the solution, for example. Like FIG. 11, a list of relevant codes (from the National Electrical Code®, 2020, in this example) are displayed, including 410.10C in ducts or hoods 1210, 430.22 single motor 1212, and 430.102(B) motor 1214.

Figure 13:
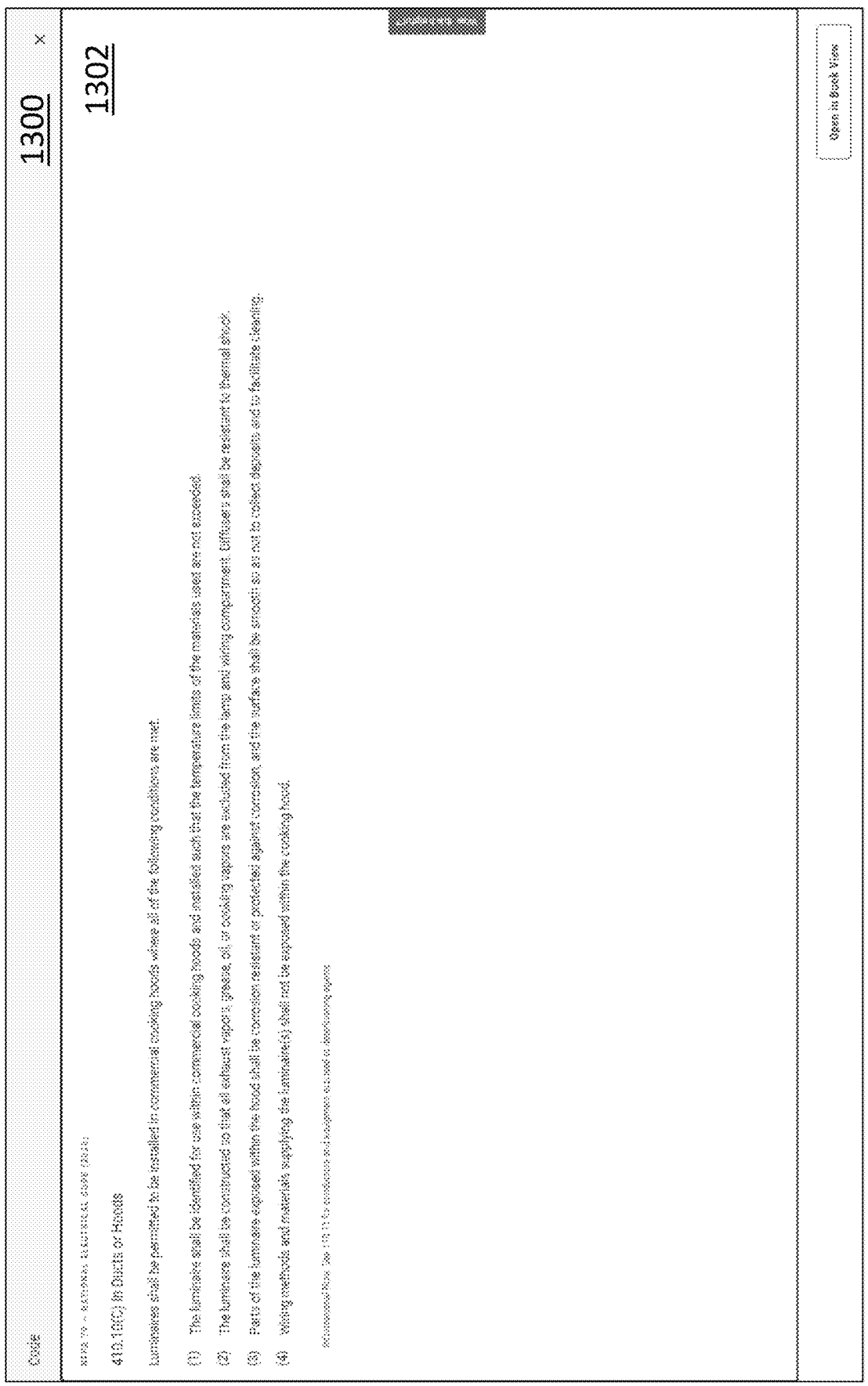

FIG. 13 shows a further illustrative user interface 1300 of a situational navigation system, according to some embodiments of the technology described herein. The system can change from displaying the interface 1100 of FIG. 11 or the interface 1200 of FIG. 12 to displaying the interface 1300 of FIG. 13 if, for example, a user selects the code 410.10C in ducts or hoods 1110 in the interface 1100 of FIG. 11 or the code 410.10C in ducts or hoods 1210 in FIG. 12. In the illustrated example, a code section 1302 is displayed. For example, the code sections 1110-1114 and 1210-1214 as shown in FIGS. 11-12, respectively, may be links, which, when clicked or tapped by the user, may display the listed code section as shown in FIG. 13.

Figure 14:
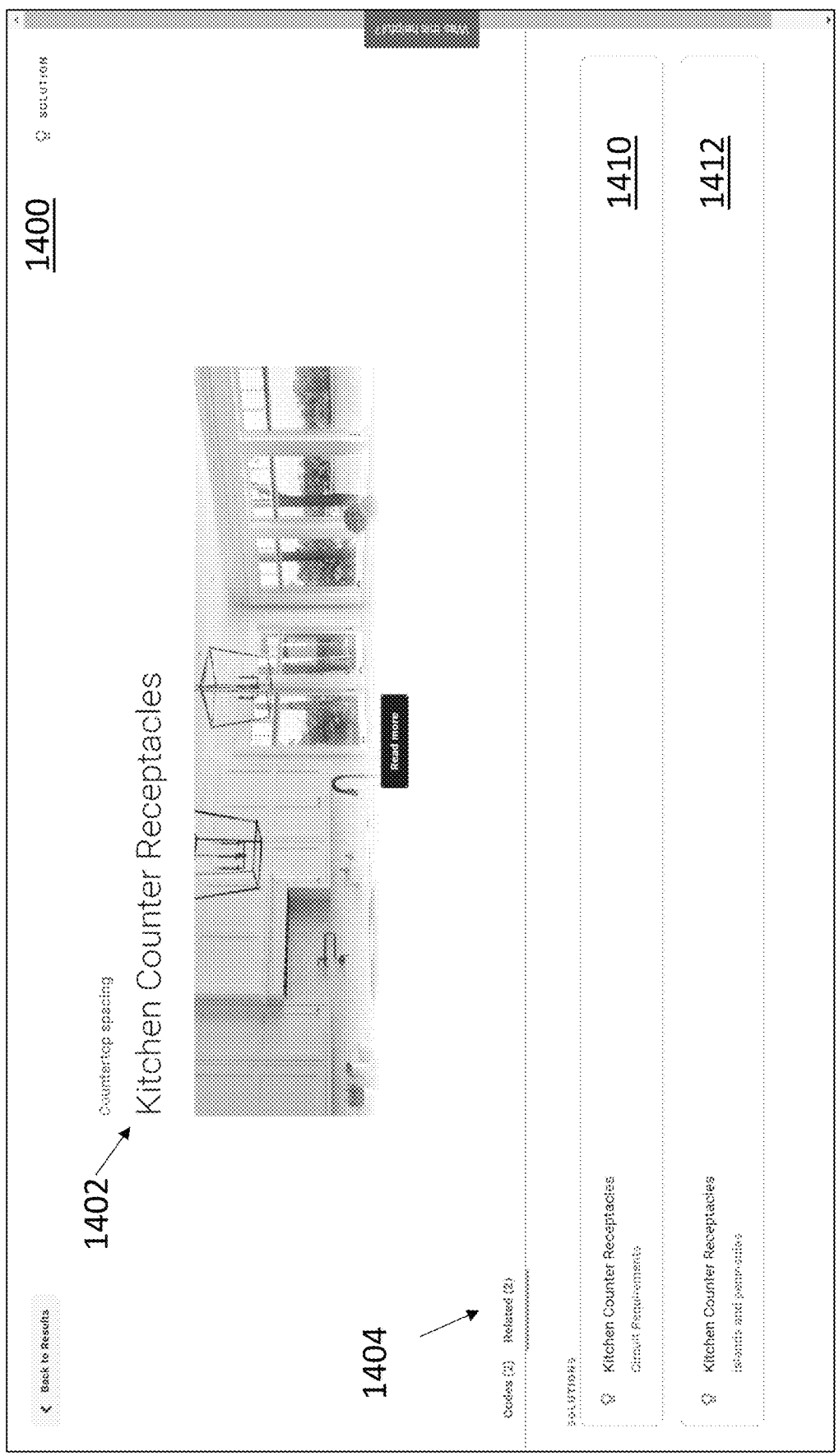

FIG. 14 shows a further illustrative user interface 1400 of a situational navigation system, according to some embodiments of the technology described herein. In the illustrated example, a solution is shown. In this example, at 1402 the solution is titled "Countertop spacing" and is related to the "Kitchen Counter Receptacles" situation. The kitchen can display user interface 1400 if, for example, the user selects a corresponding solution (e.g., as discussed in conjunction with FIG. 10). As shown, the solution in this example includes related information in a Related tab 1404 of the solution. The related information in this case includes links to two further solutions, Circuit Requirements 1410 and Islands and peninsulas 1412. As described herein, related information may include any suitable documents, images, videos, or other types of information. In one example, product or manufacturer information may be provided as part of the related information.

Figure 15:
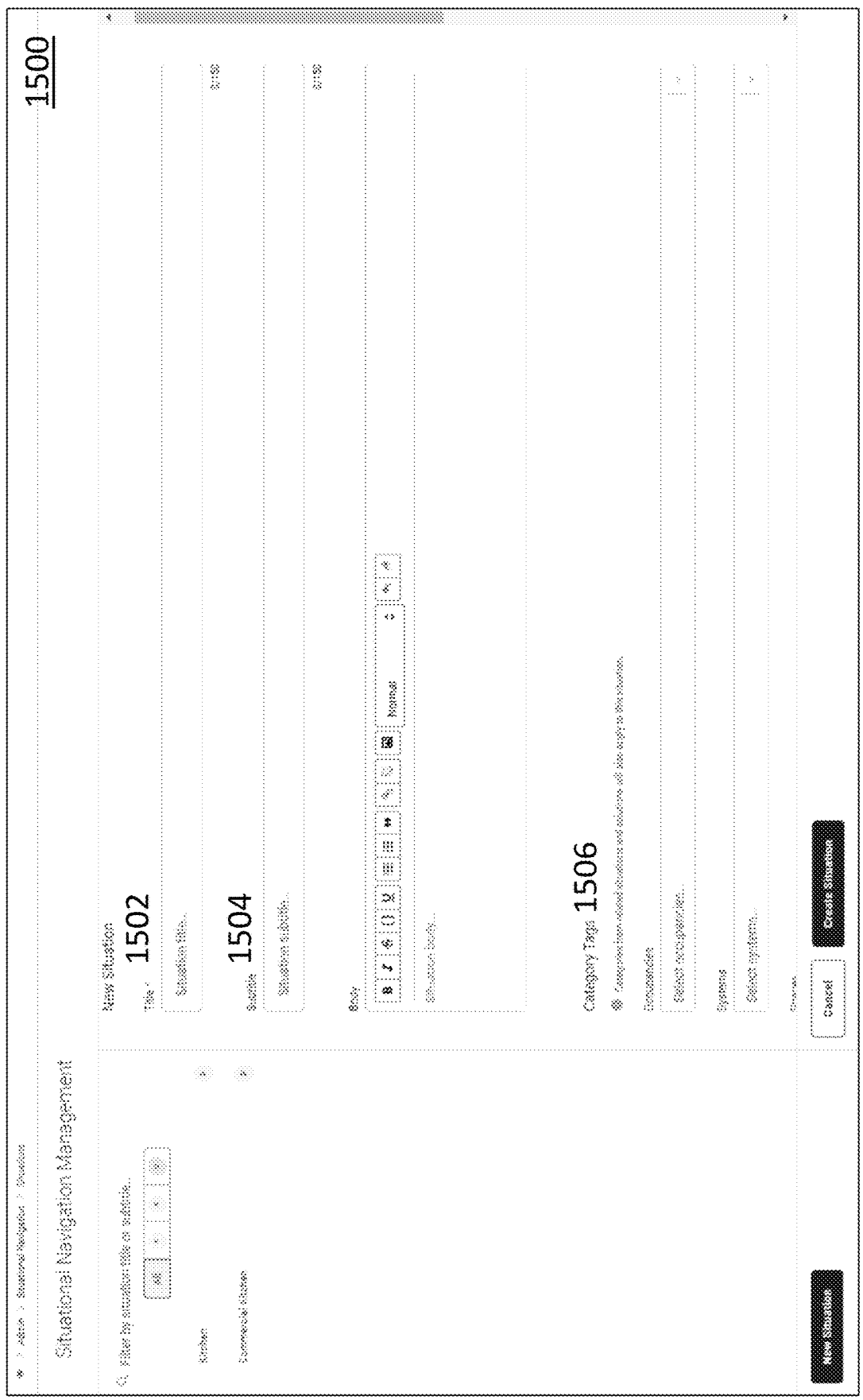
FIGS. 15-18 show illustrative user interfaces of a situational navigation management system, according to some embodiments of the technology described herein.
Figure 16:
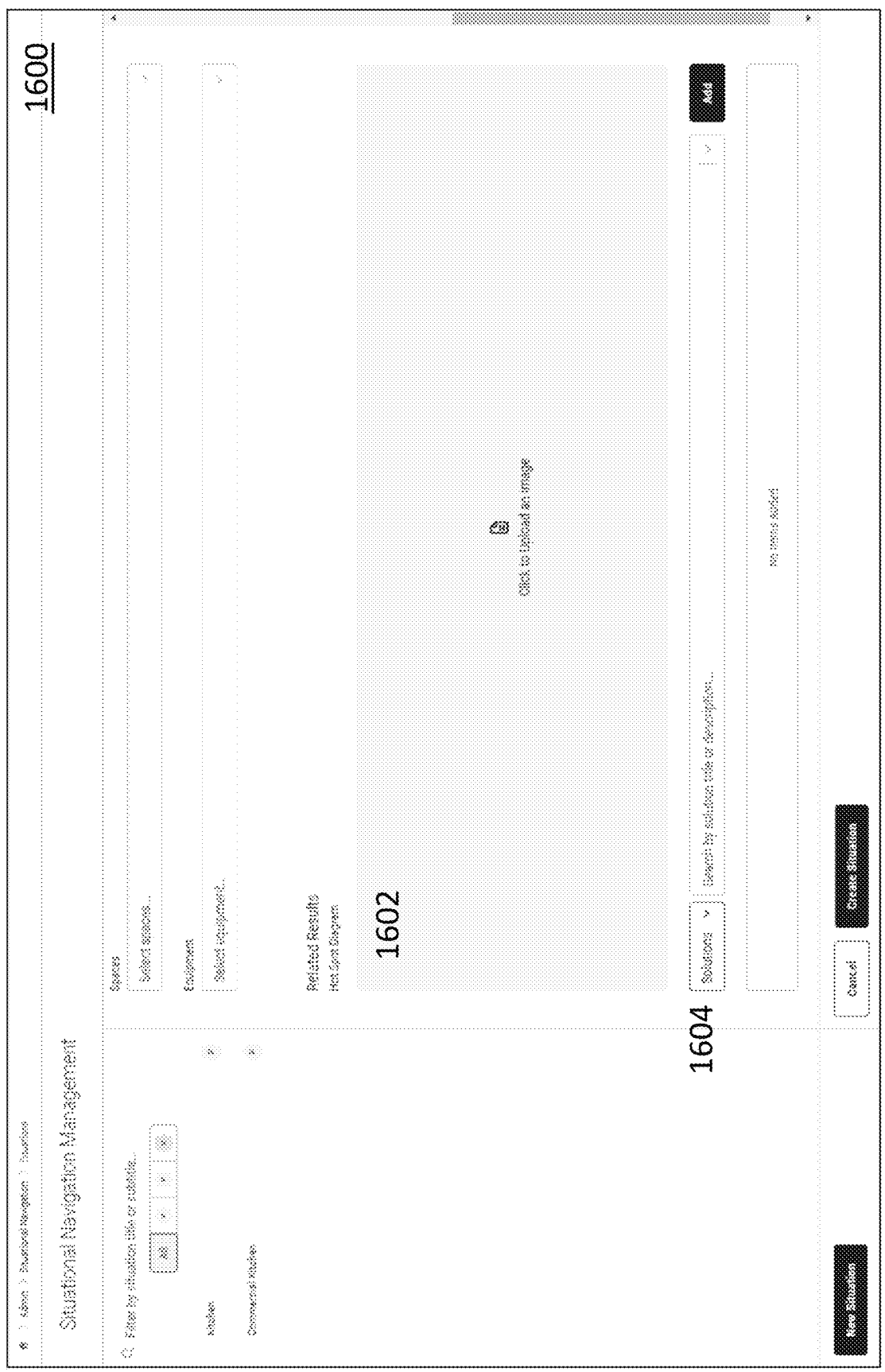
Figure 17:
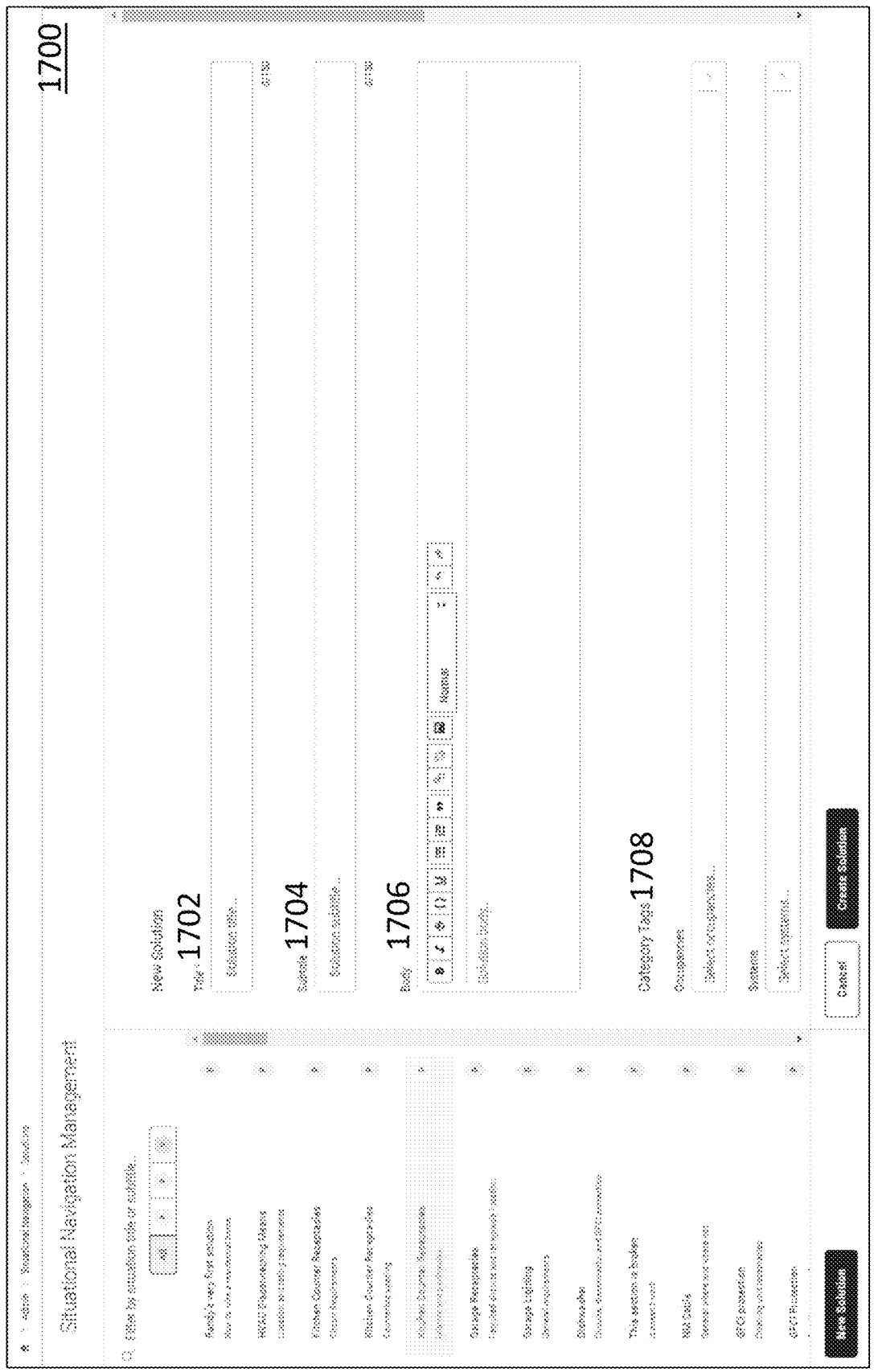
Figure 18:
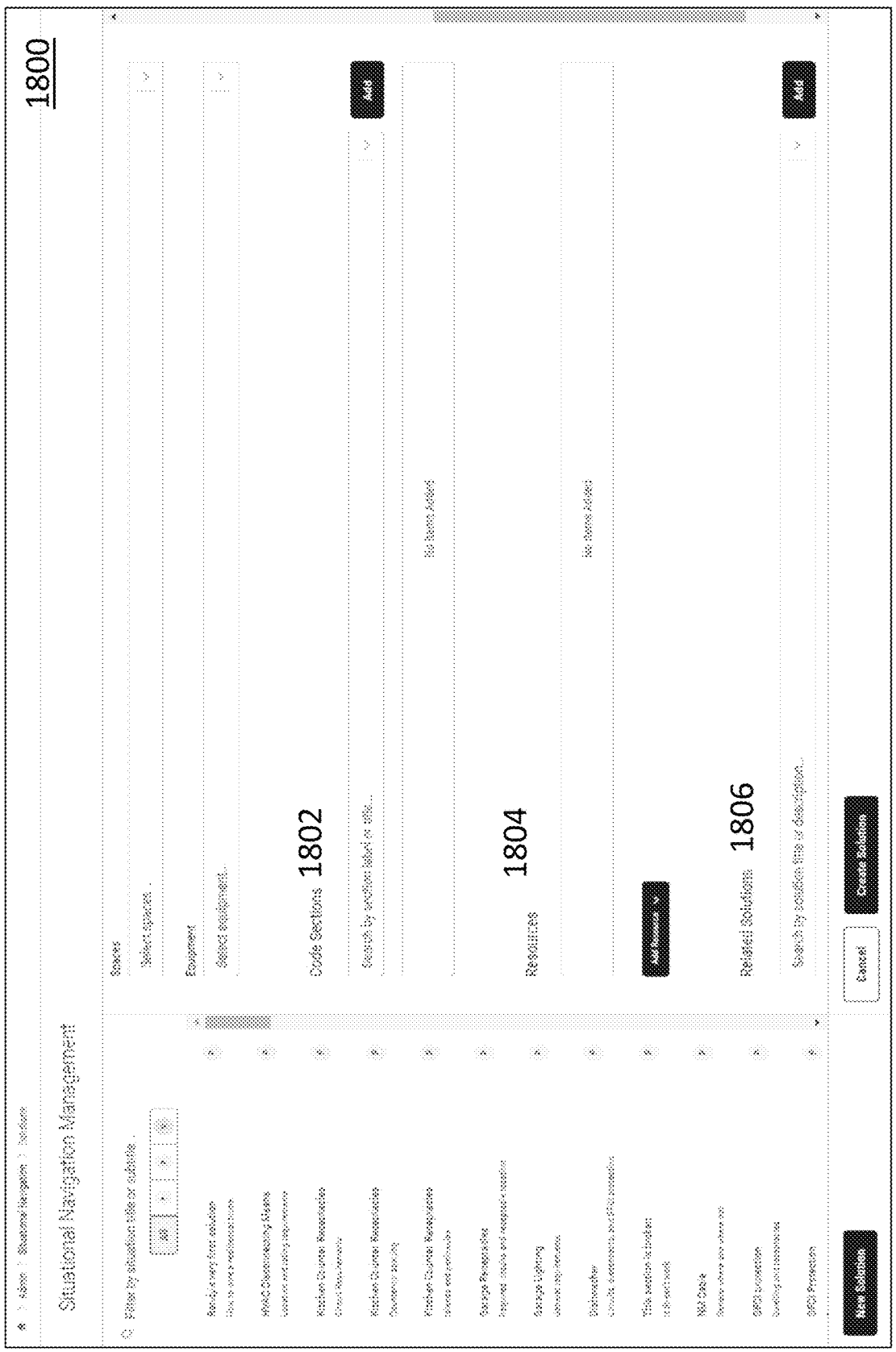

FIGS. 15-18 show illustrative user interfaces of a situational navigation management system, according to some embodiments of the technology described herein. As shown in FIGS. 15-16, the illustrated user interfaces 1500 and 1600, respectively, include a user interface for creating new situations for the situational navigation system. For example, a title 1502, subtitle 1504, category tags 1506, an image 1602, and one or more solutions 1604 may be provided by a user (e.g., an administrator of the situational navigation system) via the interface shown in FIGS. 15-16. As shown in FIGS. 17-18, the illustrated user interfaces 1700, 1800 include a user interface for creating new solutions for the situational navigation system. For example, a title 1702, subtitle 1704, body 1706, category tags 1708, code sections 1802, resources 1804, and/or related solutions 1806 may be provided be a user (e.g., an administrator of the situational navigation system) via the interface shown in FIGS. 17-18.

Figures 19, 20:
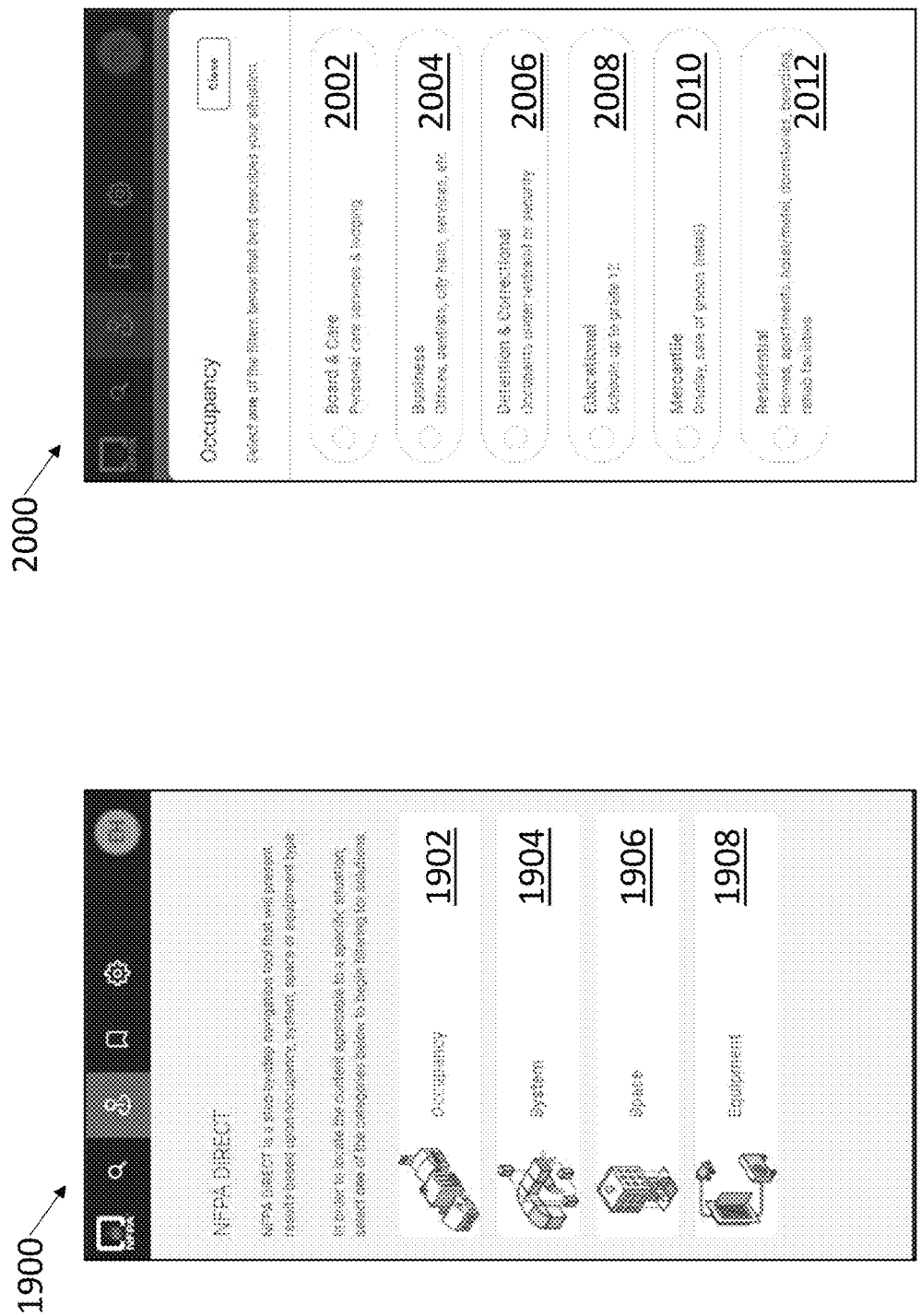
FIGS. 19-23 show illustrative mobile user interfaces of a situational navigation system, according to some embodiments of the technology described herein.
Figure 21:
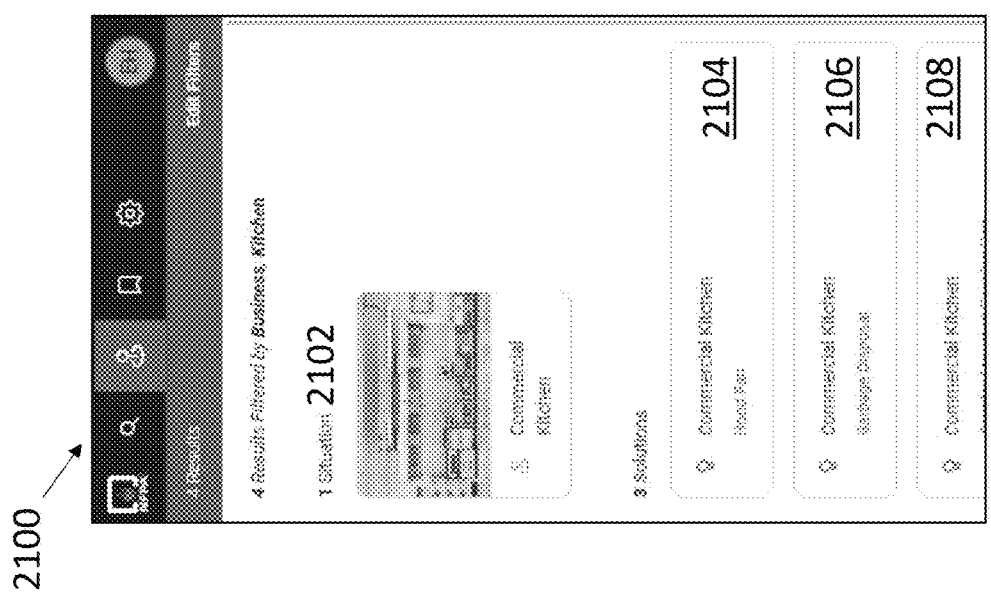

FIGS. 19-23 show illustrative mobile user interfaces 1900-2300 of a situational navigation system, according to some embodiments of the technology described herein. For example, in FIG. 19, a mobile user interface 1900 displaying categories (e.g., corresponding to those shown in the user interface of FIG. 7, namely Occupancy 1902, System 1904, Space 1906, and Equipment 1908) is illustrated. In FIG. 20, a mobile user interface 2000 displaying filters (e.g., corresponding to those shown in FIG. 8, namely Board & Care 2002, Business 2004, Detention & Correctional 2006, Educational 2008, Mercantile 2010, and Residential 2012) is illustrated. In FIG. 21, a mobile user interface 2100 displaying results (including, in this example, commercial kitchen 2102 situation and the three solutions commercial kitchen—hood fan 2104, commercial kitchen—garbage disposal 2106, and commercial kitchen—counter-mounted cooking unit 2108)) is illustrated.

Figure 22:
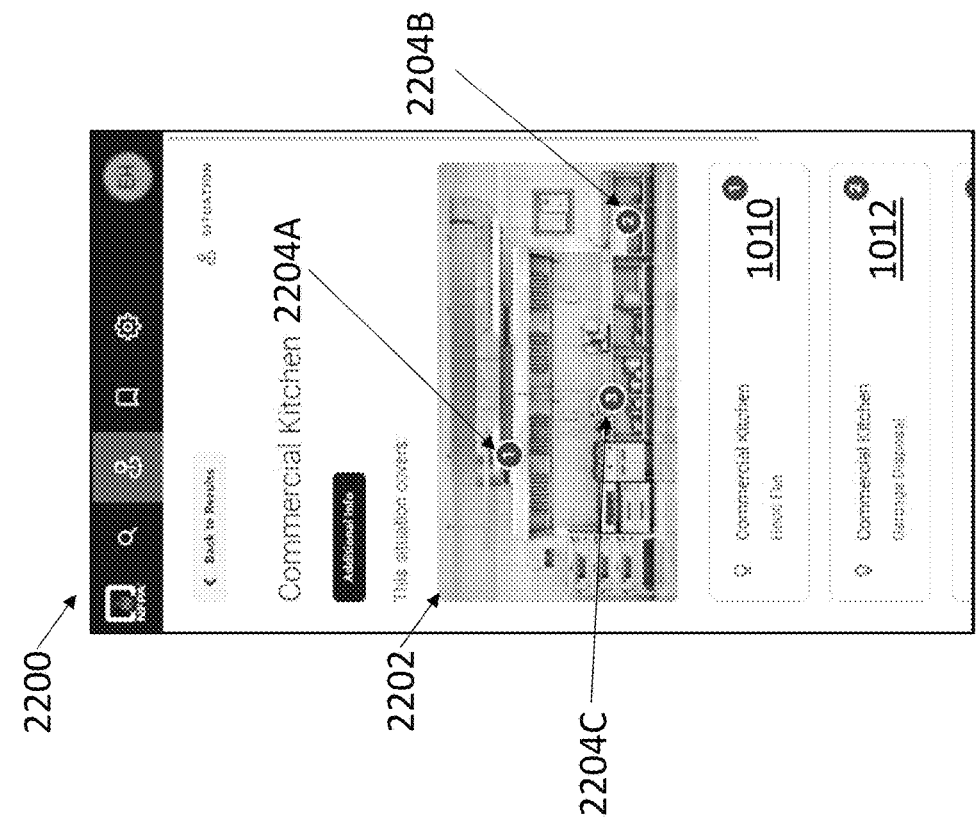

In FIG. 22, a mobile user interface 2200 displaying a situation is shown. In the illustrated example, the image 2202 for the situation is shown in an upper portion of the screen, with solutions corresponding to hotspots of the image displayed underneath the image. In particular, similar to FIG. 10, the image 2202 contains three hotspots, labeled "1" 2204A, "2" 2204B, and "3" 2204C. As shown, the hotspots may be associated with particular locations or objects in the image (e.g., the hotspot "1" 2204A indicates a hood fan, the hotspot "2" 2204B indicates a garbage disposal, and the hotspot "3" 12204C indicated a counter-mounted cooking unit in the image). Further, as shown below the image 2202, each hotspot may be associated with a corresponding solution, shown in this example as commercial kitchen—hood fan 2210 (associated with hotspot "1" 2204A), commercial kitchen—garbage disposal 2212 (associated with hotspot "2" 2204B), and commercial kitchen—counter-mounted cooking unit, only partially shown at the bottom and which can be scrolled to by the user (associated with hotspot "3" 2204C). In some embodiments, the image of the situation is displayed filling the screen of the mobile device. The user may be able to interact with the situation via a touch screen of the mobile device, which may allow scrolling through the image, zooming in on the image, and/or selecting hotspots. Although not shown, the user may be able to access any of the information included with the situation (or any related solutions) via a tapping a menu, scrolling, or other user input.

Figure 23:
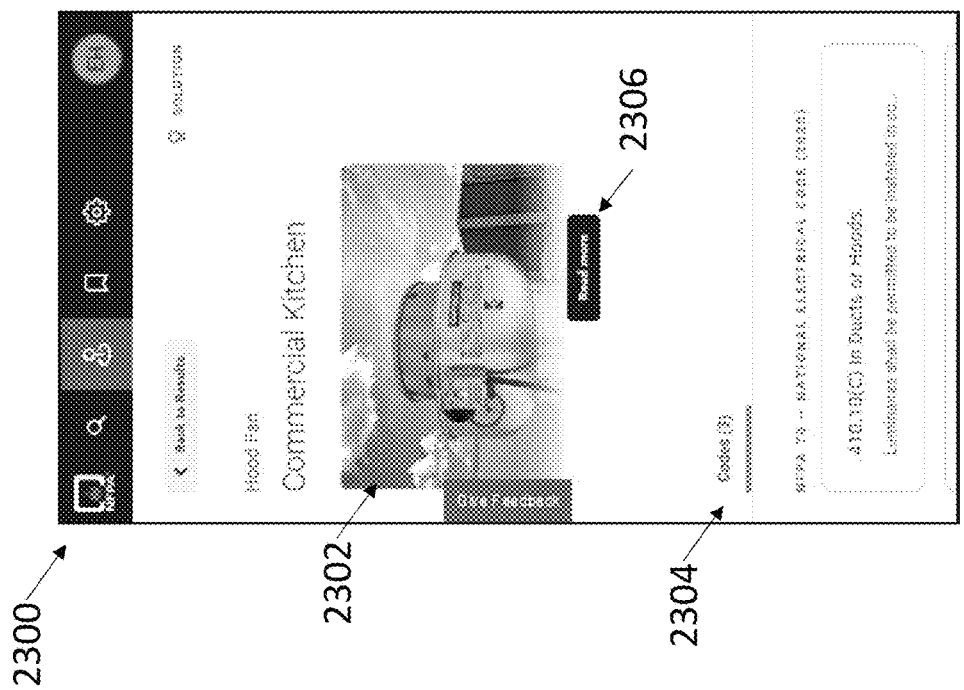

In FIG. 23, a mobile user interface 2300 displaying a solution is shown. In the illustrated example, the solution includes an image 2302 for the solution, displayed in an upper portion of the screen, with code section(s) 2304 listed below. As shown, the solution may further include a "Read more" button 2306, which may provide access (e.g., when clicked, tapped, or otherwise interacted with by the user) to additional information relating to the solution (e.g., a summary of relevant code sections, or other content as described herein).

Although specific examples of mobile user interfaces are shown in FIGS. 19-23, it should be appreciated that other interfaces are possible, including at least mobile versions of any of the interfaces described herein with respect to FIGS. 7-18.

Figure 24:
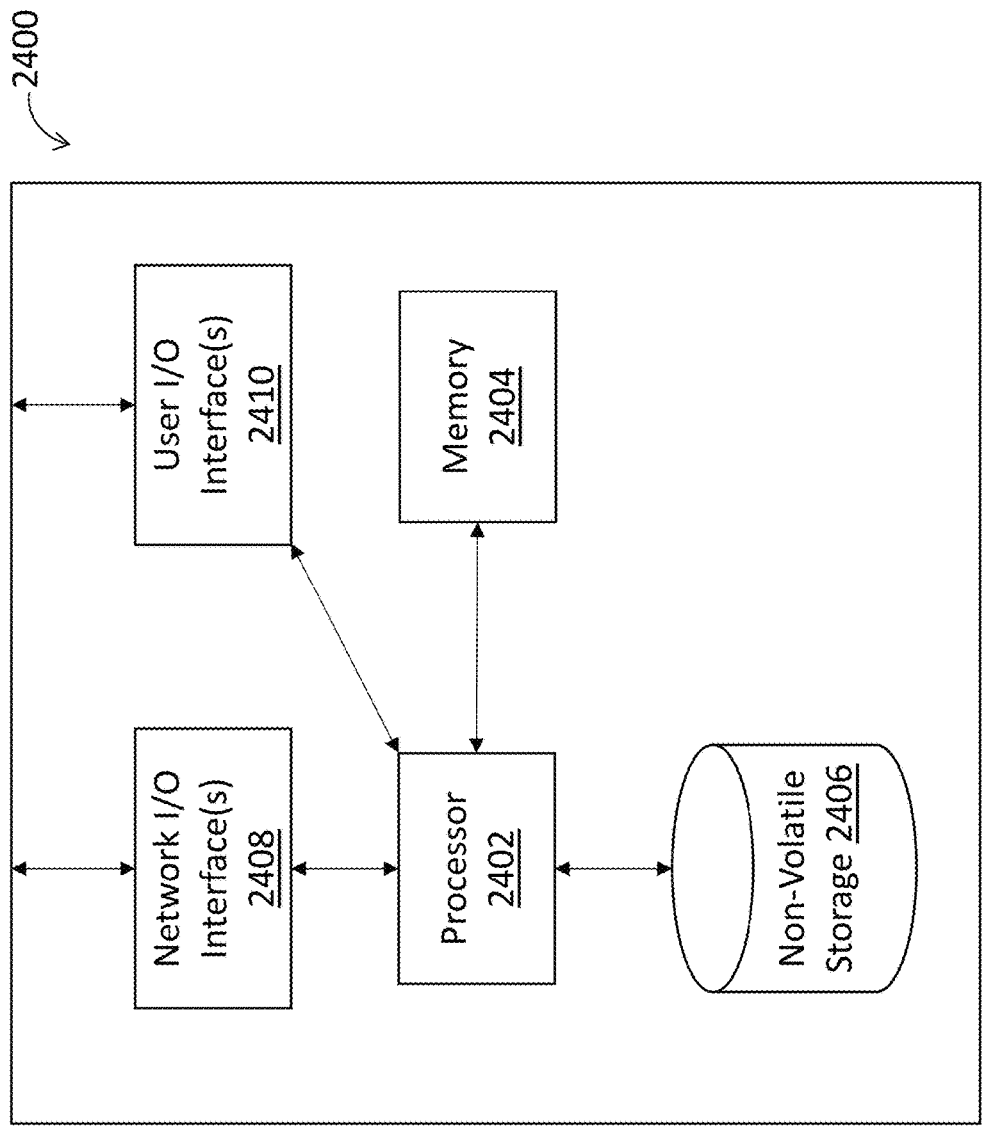
FIG. 24 is a diagram illustrating an exemplary computer system that may be used to perform any of the aspects of the techniques and embodiments disclosed herein.

An illustrative implementation of a computer system 2400 that may be used in connection with any of the embodiments of the technology described herein is shown in FIG. 24. The computer system 2400 includes one or more processors 2402 and one or more articles of manufacture that comprise non-transitory computer-readable storage media (e.g., memory 2404 and one or more non-volatile storage media 2406). The processor 2402 may control writing data to and reading data from the memory 2404 and the non-volatile storage device 2406 in any suitable manner, as the aspects of the technology described herein are not limited in this respect. To perform any of the functionality described herein, the processor 2402 may execute one or more processor-executable instructions stored in one or more non-transitory computer-readable storage media (e.g., the memory 2404), which may serve as non-transitory computer-readable storage media storing processor-executable instructions for execution by the processor 2402. Computing device 2400 may also include a network input/output (I/O) interface 2408 via which the computing device may communicate with other computing devices (e.g., over a network), and may also include one or more user I/O interfaces 2410, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described herein can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited herein.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the functions of one or more embodiments discussed herein. The computer-readable medium may be transportable such that the program stored thereon can be loaded onto any computing device to implement aspects of the techniques discussed herein. In addition, it should be appreciated that the reference to a computer program which, when executed, performs any of the functions discussed herein, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

The foregoing description of implementations provides illustration and description, but is not intended to be exhaustive or to limit the implementations to the precise form disclosed. Modifications and variations are possible in light of the teachings herein or may be acquired from practice of the implementations. In other implementations the methods depicted in these figures may include fewer operations, different operations, differently ordered operations, and/or additional operations. Further, non-dependent blocks may be performed in parallel. It will be apparent that example aspects, as described herein, may be implemented in many different forms of software, firmware, and hardware in the implementations illustrated in the figures. Further, certain portions of the implementations may be implemented as a "module" that performs one or more functions. This module may include hardware, such as a processor, an application-specific integrated circuit (ASIC), or a field-programmable gate array (FPGA), or a combination of hardware and software.

What is claimed is:

1. A system for situational navigation, the system comprising:
    at least one computer hardware processor; and
    at least one non-transitory computer-readable storage medium storing instructions that, when executed by the at least one computer hardware processor, cause the at least one computer processor to perform a method comprising:
        displaying a list of multiple categories comprising an occupancy category, a system category, a space category, an equipment category, an electrical category, a building and life safety category, and a fire protection category to a user, wherein each category in the list of multiple categories provides a classification of an environment;
        obtaining, from the user, a selection of a category from the list of multiple categories;
        based at least in part on the selection of the category, determining a list of a plurality of filters to display to the user, wherein each filter in the list of the plurality of filters is associated with a context of the environment;
        displaying the list of the plurality of filters to the user;
        obtaining, from the user, a selection of a first filter from the list of the plurality of filters, wherein the first filter is associated with a first tag;
        displaying a plurality of situations to the user, wherein the plurality of situations are associated with the first tag and wherein each of the plurality of situations is associated with an image comprising one or more hotspots comprising one or more points on the image, wherein each of the plurality of situations specifies the context of the environment;
        obtaining, from the user, a selection of at least one of the plurality of situations;
        displaying a solution of one or more objects for the selected at least one situation to the user, wherein:
            the solution is associated with the first tag, the at least one selected situation, and one or more code sections comprising one or more safety standards aggregated from one or more publications, and
            wherein the one or more points of the one or more hotspots on the image are associated with the solution and the at least one selected situation for providing a correspondence between the one or more points, and the solution and the at least one selected situation and the solution comprises one or more information types providing subject based expertise and context, comprising codes and/or standards applicable to the at least one selected situation;
        determining whether there is a second filter associated with a second tag such that neither the situation nor solution associated with the first tag is also associated with the second tag; and
        upon determining that neither the situation nor solution associated with the first tag is also associated with the second tag, removing the second filter from the list of the plurality of filters.

2. The system of claim 1, wherein the method further comprises:
    obtaining, from the user, a selection of a third filter from the list of the plurality of filters, wherein the third filter is associated with a third tag.

3. The system of claim 2, wherein the at least one of a situation or a solution is associated with the first tag and the third tag.

4. The system of claim 1, wherein determining the list of the plurality of filters to display to the user is further based on a list of situations and/or solutions, each of which is associated with one or more tags.

5. The system of claim 4, wherein determining the list of the plurality of filters to display to the user is further based on a previously selected filter of the plurality of filters.

6. The system of claim 5, wherein determining the list of the plurality of filters to display to the user comprises:
    selecting, from the plurality of filters, a set of valid filters wherein, for each valid filter, there is at least one situation and/or solution having among its associated one or more tags:
        a tag associated with the previously selected filter; and
        a tag associated with the valid filter.

7. The system of claim 1, wherein the method further comprises:
    obtaining, from the user, a selection of a second category from the list of multiple categories;
    based at least in part on the selection of the second category, determining a second list of one or more filters to display to the user; and
    displaying the second list of one or more filters to the user.

8. The system of claim 1, wherein the at least one of the situation or the solution displayed to the user comprises a first situation, and wherein the first situation comprises an image.

9. The system of claim 8, wherein a first point is displayed within the image.

10. The system of claim 9, wherein the first point is associated with a second situation, different from the first situation.

11. The system of claim 10, wherein the first point comprises a link to the second situation.

12. The system of claim 9, wherein the first point comprises a link to a solution.

13. The system of claim 1, wherein the first solution further comprises:
one or more images related to the one or more code sections;
additional text summarizing the one or more code sections, or some combination thereof.

14. The system of claim 1, wherein the first solution comprises:
at least one link to a second solution, different from the first solution;
related content, the related content comprising at least one of a document, an image, a video, or a link, or some combination thereof.

15. The system of claim 14, wherein the related content comprises manufacturer information.

16. A non-transitory computer-readable media comprising instructions that, when executed by one or more processors on a computing device, are operable to cause the one or more processors to:
display a list of multiple categories to a user comprising an occupancy category, a system category, a space category, an equipment category, an electrical category, a building and life safety category, and a fire protection category, wherein each category in the list of multiple categories provides a classification of an environment;
obtain, from the user, a selection of a category from the list of multiple categories;
based at least in part on the selection of the category, determining a list of a plurality of filters to display to the user, wherein each filter in the list of the plurality of filters is associated with a context of the environment;
display the list of the plurality of filters to the user;
obtain, from the user, a selection of a first filter from the list of the plurality of filters, wherein the first filter is associated with a first tag;
display a plurality of situations to the user, wherein the plurality of situations are associated with the first tag and wherein each of the plurality of situations is associated with an image comprising one or more hotspots comprising one or more points on the image wherein each of the plurality of situations specifies the context of the environment;
obtain, from the user, a selection of at least one of the plurality of situations;
displaying a solution of one or more objects for the selected at least one situation to the user, wherein:
the solution is associated with the first tag, the at least one selected situation, and one or more code sections comprising one or more safety standards aggregated from one or more publications, and
wherein the one or more points of the one or more hotspots on the image are associated with the solution and the at least one selected situation for providing a correspondence between the one or more points, and the solution and the at least one selected situation and the solution comprises one or more information types providing subject based expertise and context, comprising codes and/or standards applicable to the at least one selected situation;
determining whether there is a second filter associated with a second tag such that neither the situation nor solution associated with the first tag is also associated with the second tag; and
upon determining that neither the situation nor solution associated with the first tag is also associated with the second tag, removing the second filter from the list of the plurality of filters.

17. A computerized method for situational navigation, the method comprising:
displaying a list of multiple categories to a user comprising an occupancy category, a system category, a space category, an equipment category, an electrical category, a building and life safety category, and a fire protection category;
obtaining, from the user, a selection of a category from the list of multiple categories;
based at least in part on the selection of the category, determining a list of a plurality of filters to display to the user, wherein each filter in the list of the plurality of filters is associated with a context of the environment;
displaying the list of the plurality of filters to the user;
obtaining, from the user, a selection of a first filter from the list of the plurality of filters, wherein the first filter is associated with a first tag;
displaying a plurality of situations to the user, wherein the plurality of situations are associated with the first tag and wherein each of the plurality of situations is associated with an image comprising one or more hotspots comprising one or more points on the image wherein each of the plurality of situations specifies the context of the environment;
obtaining, from the user, a selection of at least one of the plurality of situations;
displaying a solution of one or more objects for the selected at least one situation to the user, wherein:
the solution is associated with the first tag, the at least one selected situation, and one or more code sections comprising one or more safety standards aggregated from one or more publications, and
wherein the one or more points of the one or more hotspots on the image are associated with the solution and the at least one selected situation for providing a correspondence between the one or more points, and the solution comprises one or more information types providing subject based expertise and context, comprising codes and/or standards applicable to the at least one selected situation;
determining whether there is a second filter associated with a second tag such that neither the situation nor solution associated with the first tag is also associated with the second tag; and
upon determining that neither the situation nor solution associated with the first tag is also associated with the second tag, removing the second filter from the list of the plurality of filters.

* * * * *